United States Patent
Candrian et al.

(10) Patent No.: US 9,009,623 B2
(45) Date of Patent: *Apr. 14, 2015

(54) CUSTOM ORDERING OF AN ARTICLE

(71) Applicant: NIKE, Inc., Beaverton, OR (US)

(72) Inventors: Natalie A. Candrian, Portland, OR (US); Shane S. Kohatsu, Portland, OR (US)

(73) Assignee: NIKE, Incorporated, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,934

(22) Filed: Sep. 5, 2013

(65) Prior Publication Data

US 2014/0006204 A1  Jan. 2, 2014

Related U.S. Application Data

(63) Continuation of application No. 13/593,261, filed on Aug. 23, 2012, now Pat. No. 8,555,202, which is a continuation of application No. 11/420,926, filed on May 30, 2006, now Pat. No. 8,266,546.

(51) Int. Cl.
| | | |
|---|---|---|
| *G06F 15/00* | (2006.01) | |
| *G06F 13/00* | (2006.01) | |
| *G06Q 30/06* | (2012.01) | |

(52) U.S. Cl.
CPC ........ *G06Q 30/0621* (2013.01); *G06Q 30/0603* (2013.01)

(58) Field of Classification Search
CPC ...................... G06Q 30/0621; G06Q 30/0603

USPC ................ 715/815, 853–854, 838–840, 740, 715/833–835, 763–765
See application file for complete search history.

(56) References Cited

U.S. PATENT DOCUMENTS

| | | | |
|---|---|---|---|
| 6,317,142 B1 * | 11/2001 | Decoste et al. | ............... 715/762 |
| 7,216,116 B1 | 5/2007 | Nilsson et al. | |
| 7,254,785 B2 | 8/2007 | Reed | |
| 2002/0050978 A1 | 5/2002 | Rosenberg et al. | |
| 2003/0033207 A1 | 2/2003 | Litke et al. | |
| 2004/0024645 A1 | 2/2004 | Potter et al. | |
| 2005/0071242 A1 * | 3/2005 | Allen et al. | ..................... 705/26 |
| 2006/0100934 A1 | 5/2006 | Burr et al. | |
| 2008/0082426 A1 | 4/2008 | Gokturk et al. | |

OTHER PUBLICATIONS www.keds.com Mar. 2006 (U.S. Appl. No. 11/420,926).
International Search Report and Written Opinion issued in corresponding PCT Application No. PCT/2007/012227, dated Nov. 10, 2008 (U.S. Appl. No. 11/420,926).

* cited by examiner

*Primary Examiner* — Kevin Nguyen
(74) *Attorney, Agent, or Firm* — Banner & Witcoff, Ltd.

(57) ABSTRACT

A manufacturer or other retailer provides a consumer with a graphical user interface for customizing an article. The graphical user interface includes an analog-style selection control that allows a user to select at least one characteristic of a feature of the article. With this type of selection control, a consumer need not select a particular control value or designate a combination of control values to choose a characteristic for a feature of an article to be custom-manufactured. Instead, the consumer need only select a position or value relative to a range of positions or values provided by the analog-style selection control.

25 Claims, 25 Drawing Sheets

CUSTOM ORDERING OF AN ARTICLE

RELATED APPLICATION DATA

This application is a continuation of U.S. patent application Ser. No. 13/593,261 filed Aug. 23, 2012 in the names of Natalie A. Candrian and Shane S. Kohatsu and entitled "Custom Ordering of an Article," now U.S. Pat. No. 8,555,202, which application is a continuation of U.S. patent application Ser. No. 11/420,926 filed May 30, 2006 in the names of Natalie A. Candrian and Shane S. Kohatsu and entitled "Custom Ordering of an Article," now U.S. Pat. No. 8,266,546. Each of these parent applications is entirely incorporated herein by reference.

FIELD OF THE INVENTION

The present invention relates to tools and techniques for custom ordering an article. Various aspects of the present invention are particularly applicable to the custom ordering of apparel or equipment.

BACKGROUND OF THE INVENTION

As electronic communication has become more popular, consumers are using this medium more frequently to obtain goods and services. Many consumers now employ the Internet to purchase articles ranging from airline tickets to automobiles. For example, some consumers may to access one or more Web pages maintained on a retailer's computer through the Internet, and then use these Web pages to view, select and purchase a product from that retailer. Other consumers may use electronic mail (commonly referred to as "email") to order goods and services from a retailer. In some instances, a consumer may employ electronic mail to send or receive information relating to goods or services that the consumer has purchased over the Internet.

Some retailers have taken advantage of the flexibility offered by these electronic marketplaces to provide consumers with a broader range of choices for goods and services. For example, some manufacturers and retailers now permit a consumer to customize a manufactured article by specifying the characteristics of one or more features of the article, such as its size, color, or the structure of its construction. Some manufacturers and retailers may even permit a consumer to select one or more images to be emblazoned on the article. Typically, the manufacturer or retailer will provide the consumer with some type of graphical user interface for specifying the characteristics of the customizable features of the article. This type graphical user interface thus will display the choice of characteristics that a consumer can select for a customizable feature of the article.

More particularly, the graphical user interface typically will include one or more discrete-style "controls" for selecting among the different characteristics available to customize a feature of an article. For example, a graphical user interface will typically employ a list box control, check box controls, radio controls, button controls, a spinner control, or some combination of one or more of these controls. A list box control (also known as a "drop-down menu") provides a list of values, with each value representing a characteristic choice for an article feature. A user may then specify a desired feature characteristic, such as a color for an exterior surface of an article, by selecting the value in the list representing that characteristic. Check box controls also provide a list of values representing characteristic choices for an article. Rather then selecting a value in the list, however, the user will specify a characteristic by selecting a check box control associated with a value in the list. Radio controls are similar to check box controls, but a radio controls prevent a user from selecting multiple characteristic choices. When a user selects a radio control associated with a value in the list, any previously selected radio control is automatically deselected.

With button controls, a button is provided for each available characteristic choice. Typically, each button will contain a value representing its associated characteristic, and the user will select a button to choose its associated characteristic. With a spinner control, the control will typically include a value field, an up arrow button, and a down arrow button. The value field will display a value representing the currently selected characteristic, and a user can change the value by discretely selecting either the up arrow button or the down arrow button. This type of control is more commonly used for characteristics that have a numerical aspect, such as a dimension (e.g., height, width, or length), a volume, or a weight.

With each of these discrete-style controls, the value representing a characteristic may be text, an image, or a combination of both. For example, if a text box has a list of items representing color characteristics, the text box may provide a list of the words "white," "black," "red," "blue," "green," "brown," "yellow," and "purple." Alternately, the text box may simply provide a list of rectangle images that are colored white, black, red, blue, green, brown, yellow and purple, respectively. Still further, the text box may provide the list of the words "white," "black," "red," "blue," "green," "brown," "yellow," and "purple," with an appropriately-colored rectangle image next to each word.

A consumer can employ these types of discrete-style selection controls to easily select a desired feature characteristic from among a small group of characteristic choices. Consumers often have more difficulty, however, employing these types of controls to select from among a large number of choices. When faced with a large number of different choices, for example, many consumers are overwhelmed and dissatisfied with the selection experience. In some cases, a consumer may even decide not to purchase an article, rather than have to select each of the feature characteristics required to custom order an article. Accordingly, it would be beneficial to provide techniques that will allow consumers to more easily select desired article characteristics from a large number of different feature characteristic choices.

It also would be desirable to provide consumers with greater flexibility in customizing the appearance of an article. For example, some retailers will allow a user to select an image that will appear on a surface of the article. While the user may have a wide variety of images from which to select, however, the consumer typically is permitted only to choose whether or not a particular image will appear at a specific location on the article. The consumer usually cannot vary the location for the image or the amount of the image that will appear on the article. This lack of choice may lead a consumer to decline the purchase of an article, even when the consumer likes both the article and an image offered for the article. It would therefore be beneficial to allow a consumer to modify the characteristics of an image that will be emblazoned on a custom-designed article.

BRIEF SUMMARY OF THE INVENTION

Various aspects of the invention advantageously provide a consumer with a more satisfying experience in selecting from among different feature characteristics when customizing an article. According to some examples of the invention, a manufacturer or other retailer provides a consumer with a graphical user interface for customizing an article. The graphical user interface includes an analog-style selection control that permits a user to select a characteristic of at least one feature of the article. For example, the analog-style selection control may be a linear or "slider" selection control. Alternately, the analog-style selection control may be a rotational or "dial" selection control. With these types of analog-style selection controls, a consumer need not select a particular discrete selection value or a combination of discrete selection values to choose a desired feature characteristic. Instead, the consumer need only select a position or value relative to a range of positions or values provided by the analog-style selection control.

Still other examples of the invention provide a consumer with an option of controlling the amount of an image that will appear on a custom manufactured article. The amount of an image may be determined, for example, based upon the complexity of the image, the total area of the image, or the ratio of the area of the image to a remaining area of the article. With some implementations of the invention, the image may be a picture or pattern that is sewn into, printed on, or applied to the article. For still other implementations of the invention, the image may be formed by one or more contrasting surface topologies or materials of the article, or otherwise emblazoned on the surface of the article.

DETAILED DESCRIPTION OF THE INVENTION

Overview

Various aspects of the invention advantageously provide a consumer with a more satisfying experience in selecting from among different feature characteristics when customizing an article. According to different examples of the invention, a manufacturer or other retailer provides a consumer with a graphical user interface for customizing an article. The graphical user interface includes an analog-style selection control that allows a user to select at least one characteristic of a feature of the article. With this type of selection control, a consumer need not select a particular control value or designate a combination of control values to choose a characteristic for a feature of an article to be custom-manufactured. Instead, the consumer need only select a position or value relative to a range of positions or values provided by the analog-style selection control.

Still other examples of the invention may provide a consumer with the ability to specify the amount of an image that will appear on a custom-ordered article. The amount of an image may be determined, for example, based upon the complexity of the image, the total area of the image, or the ratio of the area of the image to a remaining area of the article. As will be discussed in more detail below, various examples of the invention may provide a consumer with an analog-style selection control to select an amount of an image that will be emblazoned on a custom-ordered article.

Example Computer

Figure 1:
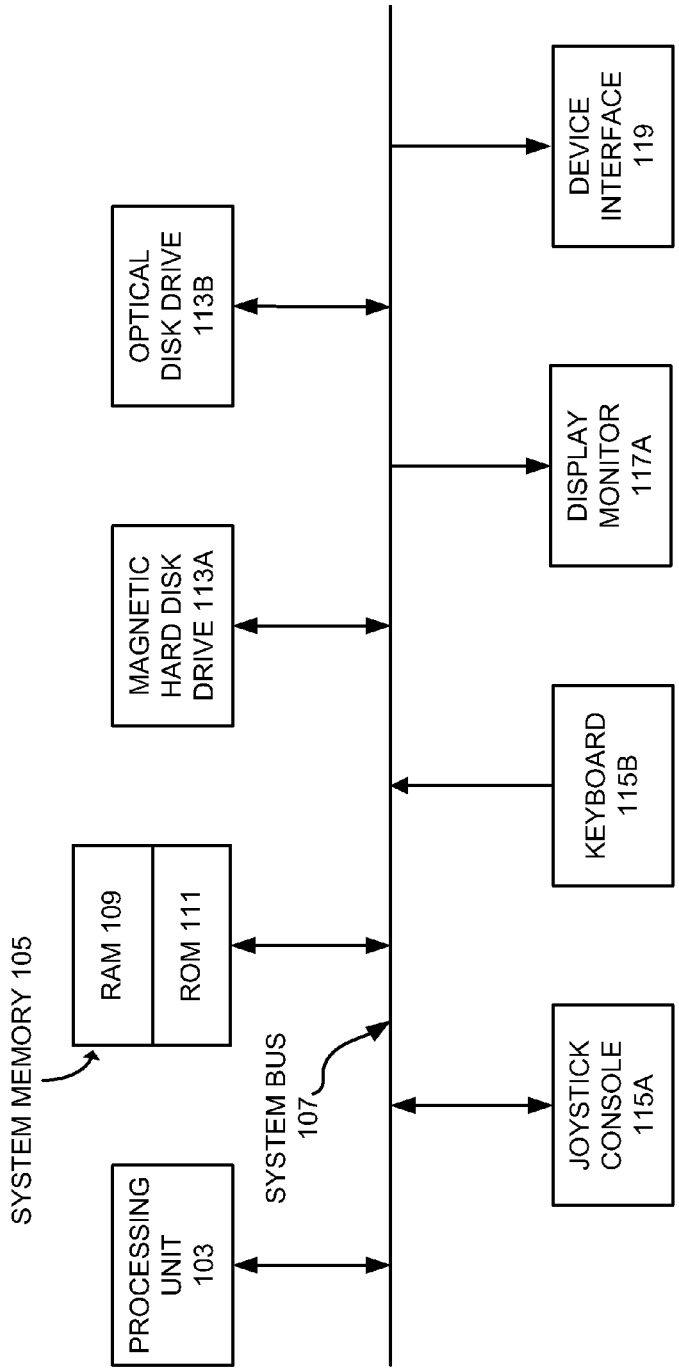
FIG. 1 schematically illustrates an example of a computer that can be used to implement a video game according to various embodiments of the invention.

As will be discussed in more detail below, various aspects of the invention may be implemented a programmable computing device or computer executing software instructions. FIG. 1 shows an example of a computer 101 that can be used to implement various examples of the invention in this manner.

The computer system 101 illustrated in FIG. 1 includes a processing unit 103, a system memory 105, and a system bus 107 that couples various system components, including the system memory 105, to the processing unit 103. The system memory 105 may include a read-only memory (ROM) 109 and a random access memory (RAM) 111.

The computer 101 may also include one or more memory storage devices 113, one or more input devices 115, and one or more output devices 117. Thus, as shown in FIG. 1, the computer 101 may include a magnetic disk drive 113A, an optical disk drive 113B, or both. The input devices 115 employed by the computer 101 may then vary depending upon the intended use of the computer 101. For example, if the computer 101 is intended primarily to host and execute video game software, then the computer 101 may have a joystick console 115A or similar human interface control suitable for gaming. If, however, the computer 101 is intended to operate as a general purpose personal computer (e.g., a conventional desktop or laptop computer), then it may alternately or additionally have a keyboard 115B.

Similarly, the output devices 117 included in the computer 101 may also vary depending upon its intended use. Most variations of the computer 101 will typically have a display monitor 117A. If the computer 101 is configured to operate as a general purpose personal computer, then it may alternately or additionally have a printer. Still other memory storage devices 113, input devices 115 and output devices 117 may include flash type memory devices, "punch" type memory devices (where physical indentations are made in the memory medium), holographic memory devices, digitizers, pressure detectors, cameras, scanners, microphones, and vibration or other motive feedback devices.

As shown in FIG. 1, the computer 101 additionally has a device interface 119. This device interface 119 may be any type of interface used to obtain data from another device. For example, the device interface 119 may be a conventional connector/port type interface, such as universal serial bus (USB) interface, a Firewire/IEEE 1394 interface, a PS/2 interface, a PC/AT interface, an RS-232 interface, a serial port interface, or an Ethernet port or other telephone-type interface. As will be appreciated by those of ordinary skill in the art, some connector/port type interfaces may have a variety of different configurations. For example, a USB interface may be a USB 1.1 interface or a USB 2.0 interface. It also may be a standard USB interface, a mini USB interface, or a micro USB interface. Accordingly, the device interface 119 may be any type of connector/port type interface of any desired configuration.

Still further, the device interface 119 may include a wireless transceiver for wireless communication with another device. For example, the device interface 119 may be implemented with a radio frequency transceiver, such as a WiFi or Bluetooth wireless transceiver. The device interface 119 may alternately be implemented with an infrared frequency transceiver, a light frequency transceiver, or an ultrasonic frequency transceiver. The device interface 119 may be an internal interface, or it may alternately be an external network interface as is well known in the art. Of course, it will be appreciated that other means of establishing a communications link with other computers may be used. Also, with various examples of the invention, the computer 101 may have a plurality of device interfaces 119.

Typically, the computer 101 will be configured to access one more other computing devices, so that a consumer can employ the computer 101 to custom-order an article through another computing device maintained by a manufacturer or retailer. Thus, the computer 101 will normally be capable of operating in a networked environment using logical connections to one or more remote devices, such as other computers. The computer 101 may be connectable to one or more remote devices through a local area network (LAN) or a wide area network (WAN), such as the Internet. When used in a networking environment, the computer system 101 may be connected to the network through the device interface 119.

Feature Characteristic Ordering Tool

As noted above, various examples of the invention provide an analog-style selection control. As noted above, a control will typically be implemented as part of a graphical user interface in a software-based device. More particularly, a computer, such as the computer 101, will execute software instructions to implement various embodiments of the invention. Based upon these instructions, the computer 101 will display a graphical user interface to a user. The user will then manipulate one or more input devices 115 to input data to the computer 101 through the user interface. For example, with various implementations of the invention, a user will manipulate an input device 115, such as a pointing device like a mouse, roller ball, joystick or touchpad, to change the appearance of a selection indicator for an analog-style selection control imbedded in the graphical user interface. The user input employed to change the appearance of the selection indicator then will correspond to a feature characteristic selection made by a user. In this manner, the appearance of the selection indicator will provide the user with information as to the user's current feature characteristic selection.

Figure 2:
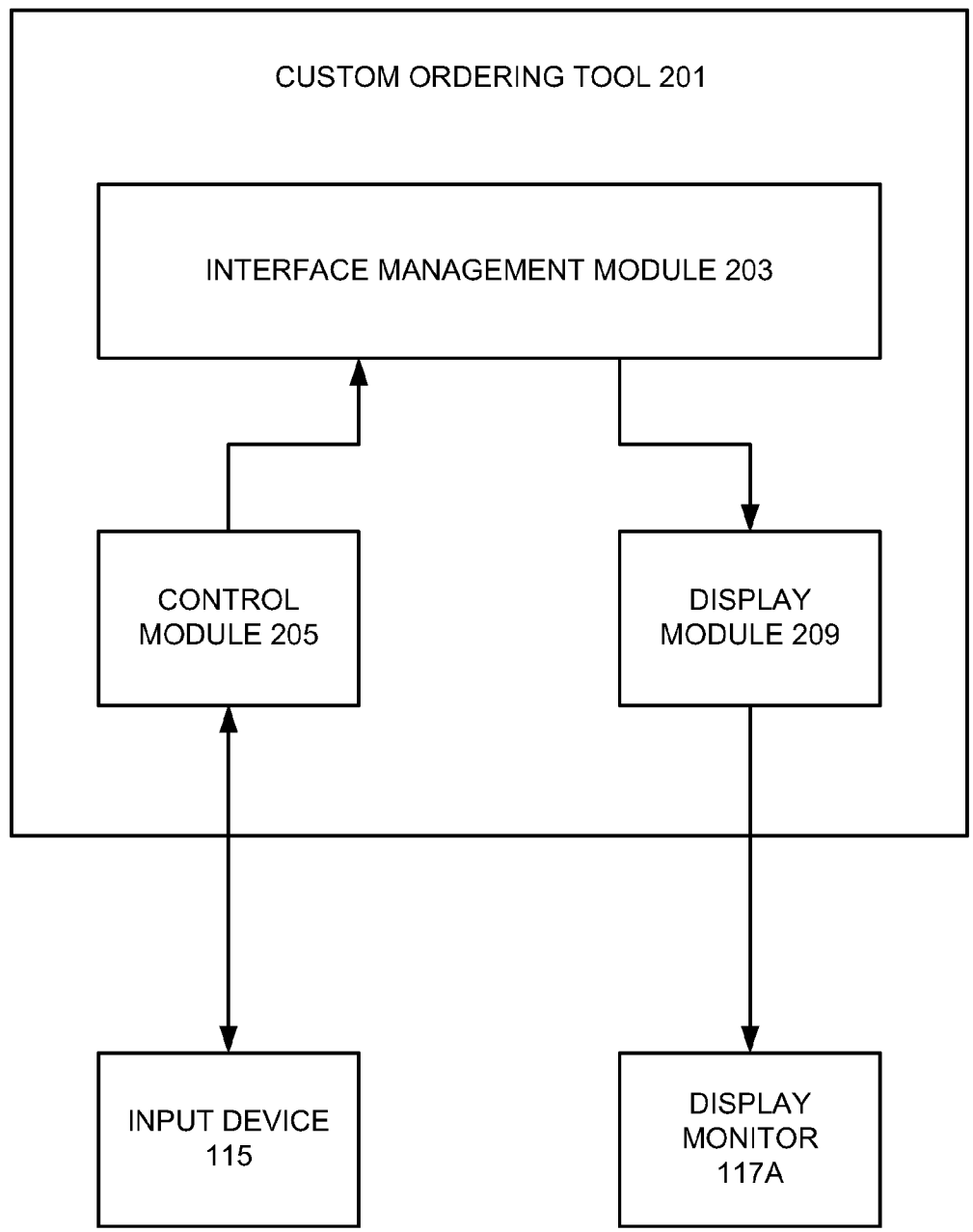
FIG. 2 illustrates an example of a custom ordering tool according to various embodiments of the invention.

FIG. 2 illustrates an example of a custom ordering tool 201 according to various embodiments of the invention that can be used to custom order an article. With some embodiments of the invention, the custom ordering tool 201 may be implemented by, for example, executing software on a programmable computing device, such as the computer 101 illustrated in FIG. 1. Of course, with still other examples of the invention, one or more components of the custom ordering tool 201 may be implemented using one or more various solid state analog electronic circuit devices.

As seen in this FIG. 2, the custom ordering tool 201 includes an interface management module 203, a control module 205, and a display module 209. The control module 205 provides an analog-style selection control, as will be discussed in further detail below. The display module 209 displays a custom ordering user interface, including a visual display of the analog-style selection control, to the user via a display monitor 117A.

By using an input device 115, such as a mouse, touchpad or keyboard, a user can input information for custom ordering an article through an analog-style selection control generated by the control module 205. More particularly, a user can manipulate the analog-style selection control to input selection information for selecting one or more feature characteristics of an article being custom ordered. In response, the control module 205 provides the received selection information to the interface management module 203. The interface management module 203 may then relay display information, corresponding to the received selection information, to the display module 209, which updates the appearance of the analog-style selection control accordingly. In this manner, the user can receive immediate visual feedback of the selection information he or she has input to the analog-style selection control.

In addition to providing the input selection information to the display module 209, the interface management module 203 also will provide the selection information to a retailer or manufacturer that will provide the article being custom ordered. For example, with some embodiments of the invention, the custom ordering tool 201 may electronically relay the selection information directly to a server computer maintained by a retailer or manufacturer. With still other examples of the invention, however, the custom ordering tool 201 may instead store the user's input selection information in memory, until it can be retrieved, either physically or electronically, by the retailer or manufacturer.

If the information is being provided to a retailer, for example the retailer can review its stock and select an article that has the feature characteristics specified by the user. If the information is being provided to a manufacturer, the manufacturer may employ the selection information to manufacture a new article that has the feature characteristics specified by the user. With some examples of the invention, the interface management module 203 may continuously provide a retailer or manufacturer with the user's input selection data. Alternately, the interface management module 203 may only provide the user's selection data to a retailer or manufacturer after the user has indicated that the input selection data represents a final set of ordering information. For example, if the user is purchasing a custom-ordered article, the interface management module 203 may postpone providing the user's selection information to a retailer or manufacturer until after the user also has provided the custom ordering tool 201 with purchasing information, such as a credit card account information or electronic payment service account information.

It should be noted that, while the interface management module 203, the control module 205 and the display module 209 are illustrated as discrete modules in FIG. 2, alternate embodiments of the invention may combine two or even all three of these modules into a single unit. It also should be appreciated that, with still other examples of the invention, the custom-ordering tool 201 will include one or more additional components to display other elements in the user interface. For example, some implementations of the invention also may include components for displaying an image of one or more features of the article being custom-ordered. When the user provides new selection information, these components will use the selection information to update the appearance of the article features to reflect the new selection information.

Analog-Style Selection Controls

Various examples of the invention may employ any type of analog-style selection control to obtain selection information from a user. Some implementations of the invention may even employ a combination of different types of analog-style selection controls to elicit selection information from a user. Two known types of analog-style selection controls are linear (or "slider") selection controls and rotational (or "dial") selection controls. While these particular types of analog-style selection controls will be discussed in more detail below, it should be appreciated that various examples of the invention may employ any other desired type of analog-style selection control.

Figure 3:
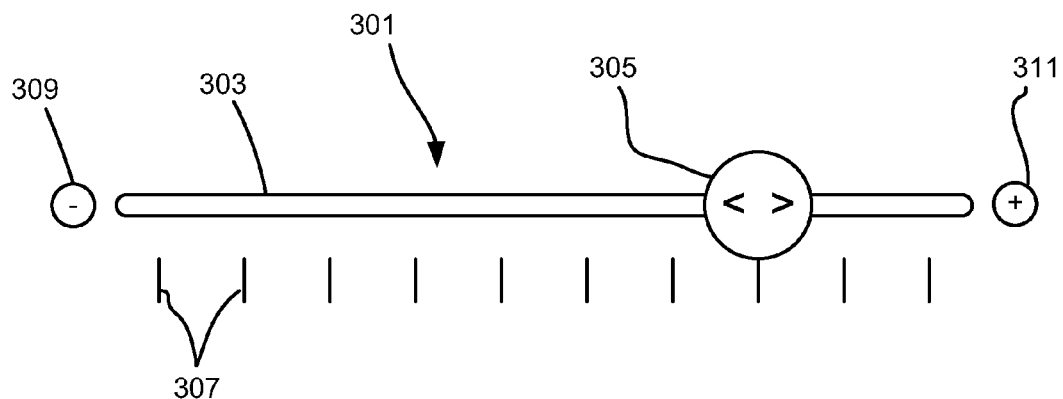
FIGS. 3-5 illustrate examples of linear analog-style selection controls that may be employed in a graphical user interface according to various embodiments of the invention.

FIG. 3 illustrates one example of a linear or "slider" analog-style selection control 301 that may be employed in a graphical user interface according to various embodiments of the invention. As seen in the figure, the slider selection control 301 includes a linear range indicator 303 and a linear position indicator 305 (sometimes also referred to as a "thumb"). With this type of analog-style selection control, a user may employ a pointing device, such as a mouse, touchpad, joystick or stylus, to designate a new position for the position indicator 305 along the length of the range indicator 303. In this manner the position indicator 305 can be used to designate some position on the linear range indicator 303 relative to the entire length of the linear range indicator 303. As will be discussed in further detail below, this position will correspond to a particular selection of one or more feature characteristics for an article being custom ordered.

In addition to the range indicator 303 and position indicator 305, the slider selection control 301 also includes direction indicators 309 and 311. These indicators 309 and 311 generally indicate the direction in which the position indicator 305 should be moved along the range indicator 303 for the user to select a desired feature characteristic. Thus, the direction indicator 309 displays the "minus" character, informing a user that moving the position indicator 305 toward the direction indicator 309 will select a smaller or lesser feature characteristic. The direction indicator 311, on the other hand, displays the "plus" character, informing a user that moving the position indicator 305 toward that indicator 311 will select a relatively higher or greater feature characteristic for the article being custom-ordered. For example, if the slider selection control 301 is being used to select a width of a shoe, moving the position indicator 305 toward the direction indicator 309 may select a shoe with a smaller size. Likewise, moving the position indicator 305 toward the direction indicator 311 may select a larger size for the shoe.

The slider selection control 301 also includes position markers 307 (sometimes referred to as "ticks"). These markers 307 may be used to designate specific positions along the range indicator 303. In the illustrated slider selection control 301, for example, there are ten position markers 307 equally spaced along the length of the range indicator 303. Thus, a user can more precisely select a new position for the position indicator 305 by using the position markers 307 as guides.

Figure 4:
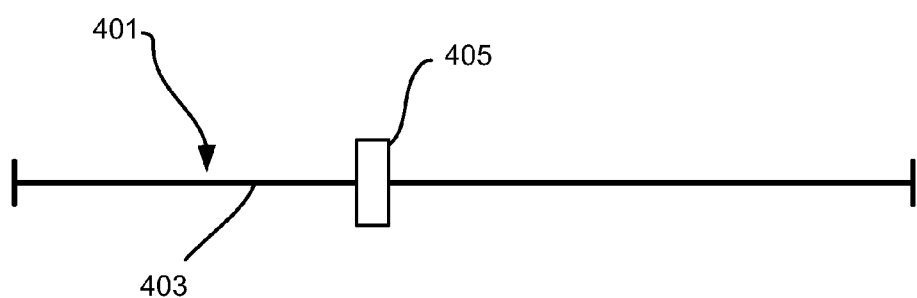
Figure 5:
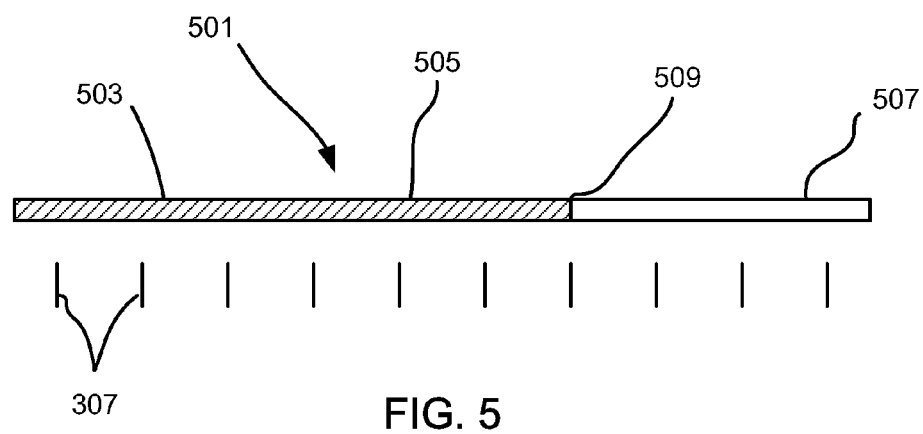

While FIG. 3 illustrates one specific type of slider-type analog-style selection control, it should be appreciated that, as previously noted, any slider-type selection control may alternately be employed according to various examples of the invention. For example, as illustrated in FIG. 4, the slider selection control 401 may include only a simple range indicator 403 and position indicator 405. FIG. 5 illustrates still another example of a slider selection control 501 that may be employed according to various embodiments of the invention. As seen in this figure, the range indicator 503 includes areas 505 and 507, with each area having a different appearance. The boundary 509 between the differently-appearing areas 505 and 507 then functions as the position indicator. More particularly, by employing an input device 115 to move the boundary 509, a user can select a particular position along the range indicator 503.

It should be noted that, while a few specific examples of slider selection controls have been illustrated in FIGS. 3-5, various examples of the invention may employ slider controls having any desired elements, including any combination of the elements illustrated in FIGS. 3-5. For example, the slider selection control 501 shown in FIG. 5 also has linear positions markers 307, but these markers can be omitted with some implementations of the invention. Similarly, some examples of the invention may employ a variant of the slider selection control 401 that includes linear position markers 307.

Figure 6:
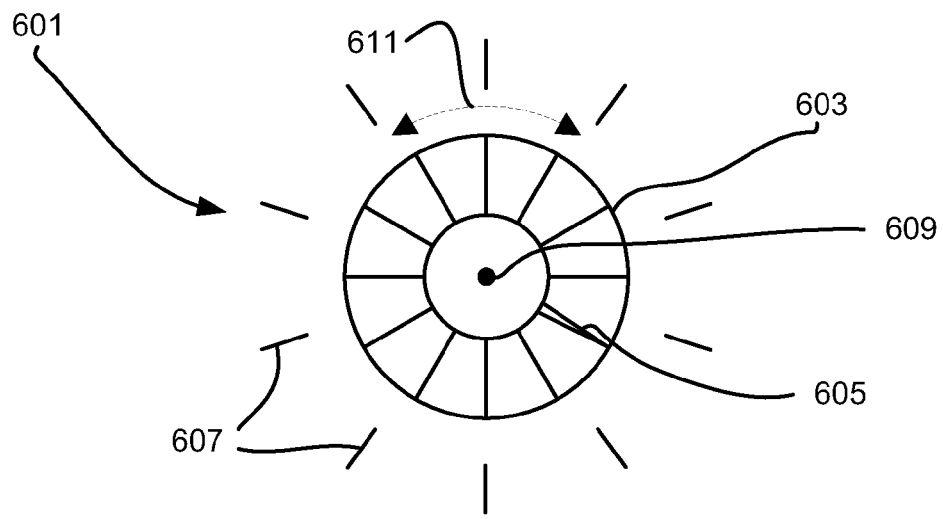
FIGS. 6-9 illustrate examples of rotational analog-style selection controls that may be employed in a graphical user interface according to various embodiments of the invention.

In addition to slider controls, various examples of the invention may alternately or additionally employ "dial" selection controls, as previously noted. With this type of control, rather than "sliding" a position indicator in a linear direction, the user employs an input device 115 to "rotate" an angular position indicator about an axis. One example of such a dial selection control 601 is illustrated in FIG. 6. As seen in this figure, the dial selection control 601 includes an angular position indicator 603. The angular position indicator 603 includes a current position marker 605 for marking the current angular position of the angular position indicator 603 relative to a previous angular position. The angular control 601 also includes a plurality of angular position markers 607, which indicate specific angular positions around the angular position indicator 603.

By providing input data using an input device 115, such as a pointing device or keyboard, a user can instruct the dial selection control 601 to "rotate" the angular position indicator 603 about its axis 609 in either of rotation directions 611. The angular position of the angular position indicator 603 then serves as selection input information for the selection of one or more feature characteristics of an article being custom ordered. By using the current position marker 605 and the angular position markers 607, a user can generally determine the amount by which the angular position indicator 603 has been rotated about its axis 609.

With some implementations, the angular control 601 may be rotated about the axis 609 continuously in either of the directions 611. That is, with these implementations, the angular position indicator may be rotated more than 360°. When the angular position indicator 603 is rotated to an angular position corresponding to the "lowest" possible selection value for a feature characteristic, further rotation of the angular position indicator 603 may simply cause the angular control to either begin increasing the selection values, or, alternatively, to begin decreasing the selection values again starting with the highest possible selection value. Still other implementations of the angular selection control 601 may allow a user only a fixed amount of angular rotation about the axis 609. For example, these implementations may only allow a user to rotate the angular position indicator 603 a total of, e.g., 180° (a half rotation), 360° (one full rotation), or 720° (two complete rotations).

Figure 7:
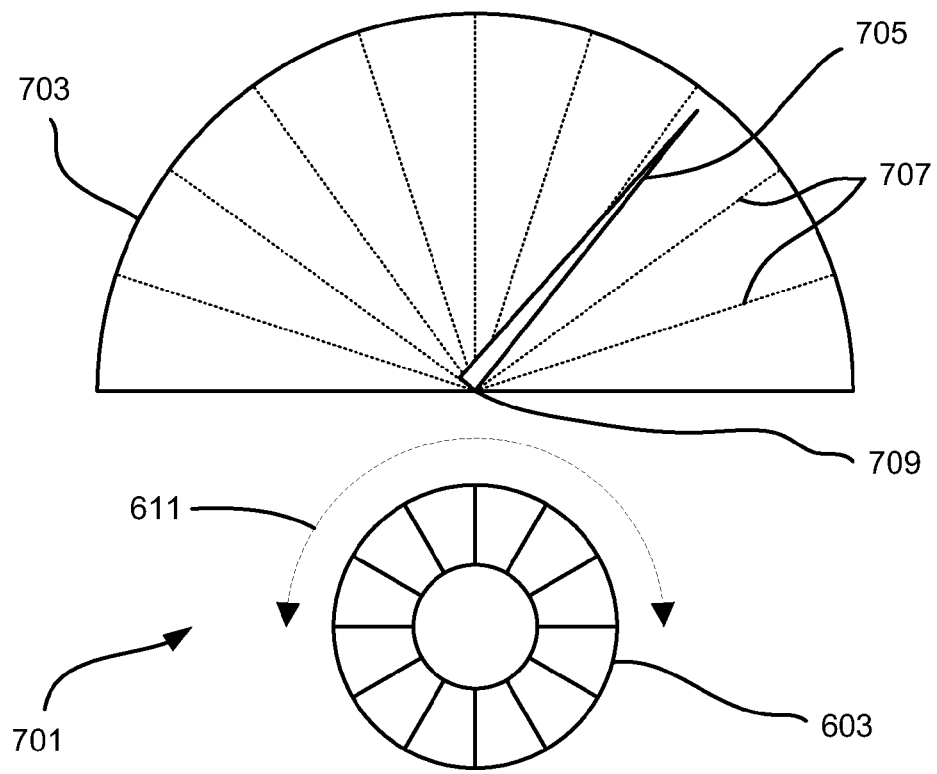

As with the slider selection controls, dial selection controls may be employed in a variety of different configurations according to various embodiments of the invention. For example, FIG. 7 illustrates another implementation of a dial selection control 701. With the dial selection control 701, the angular position indicator 603 does not include a current position marker 607. Instead, the dial selection control 701 employs a separate position indicator 703, which includes a current position marker 705 and angular position markers 707. As the angular position indicator 603 is rotated in either of rotation directions 611, the current position marker 705 is angularly rotated a proportional amount in the same direction about axis 709. By noting the change in position of the current position marker 705 relative to the angular position markers 707, a user can choose a particular rotation of the angular position indicator 703, thereby providing selection information for selecting one or more characteristic features of an article being custom-ordered.

Figure 8:
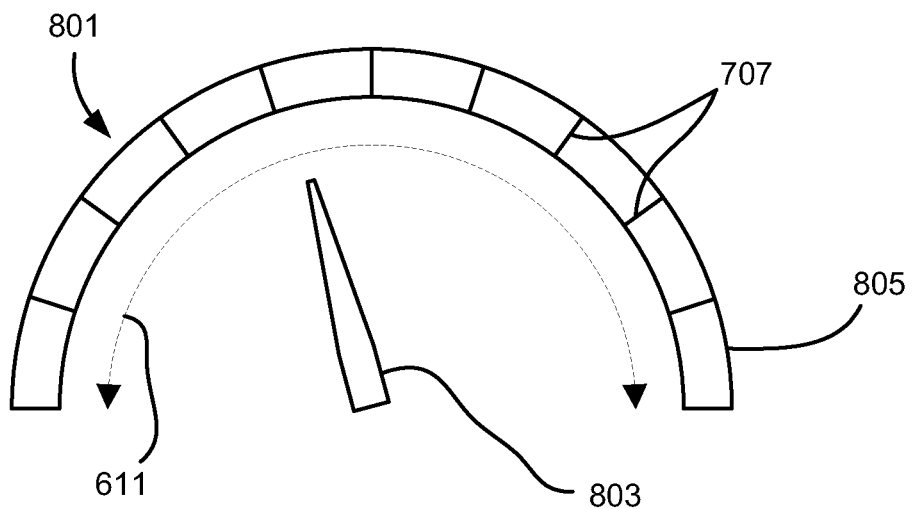

FIG. 8 illustrates yet another example of a dial selection control 801. With this implementation, the angular position indicator 803 itself serves as a current position marker, and is rotatable in either of directions 611 by input provided through an input device 115. In addition, the dial selection control 801 includes an angular position marker display 805 that includes angular position markers 707. By noting the change in position of the angular position indicator 803 relative to the angular position markers 707, a user can choose a particular rotation of the angular position indicator 803, thereby providing selection information for selecting one or more character features of an article being custom-ordered.

Figure 9:
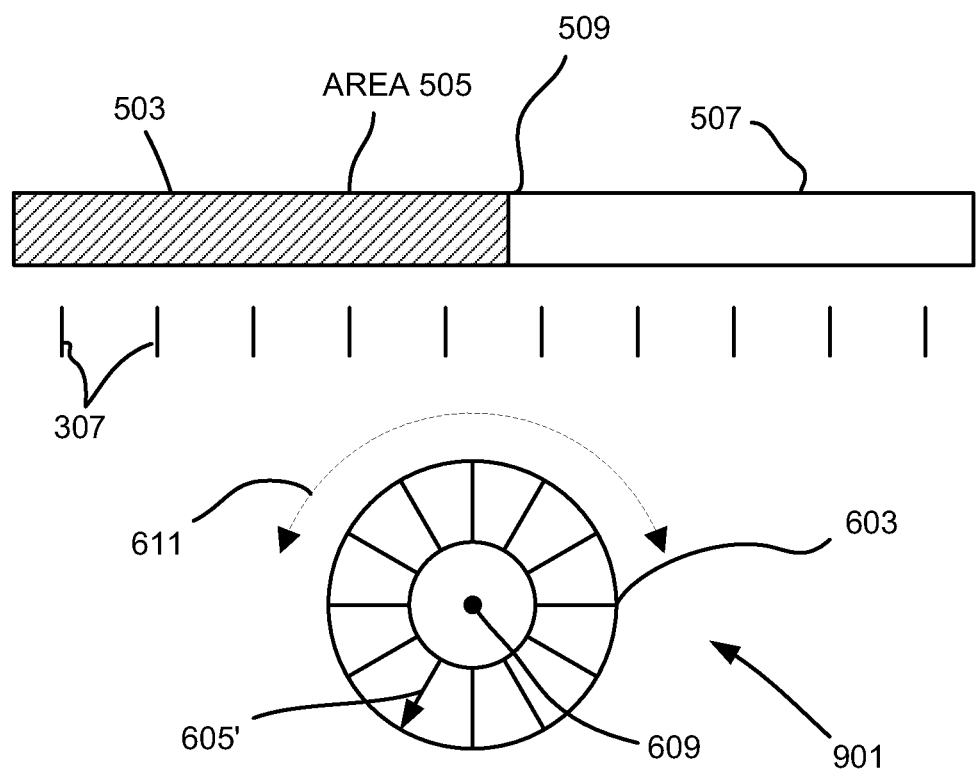

FIG. 9 illustrates yet another example of an analog-style selection control. With this implementation, however, the analog-style selection control 901 has properties of both a slider selection control and a dial selection control. As seen in this figure, the analog-style selection control 901 includes an angular position indicator 603 with a current position marker 605'. It also includes a linear range indicator 503 with a first area 505 having one appearance, a second area 507 having another appearance different from the appearance of the first area 505, and linear position markers 307.

As with the previously-described examples, a user employs an input device 115, such as a pointing device or a keyboard, to "rotate" the angular position indicator 603 about its axis 609. In response to rotation of the angular position indicator 603, the position of the boundary 509 between the first area 505 and the second area 507 changes. For example, if the user rotates the angular position indicator 603 in a clockwise direction, then the position of the boundary 509 may move a proportional amount to the right (relative to FIG. 9). Likewise, if the user rotates the angular position indicator 603 in a counter-clockwise direction, then the position of the boundary 509 may move a proportional amount to the left (relative to FIG. 9). By noting the position of the boundary 509 relative to the length of the linear range indicator 503, the user can select one or more character features of an article being custom-ordered.

Custom Ordering User Interfaces

Figure 10A:
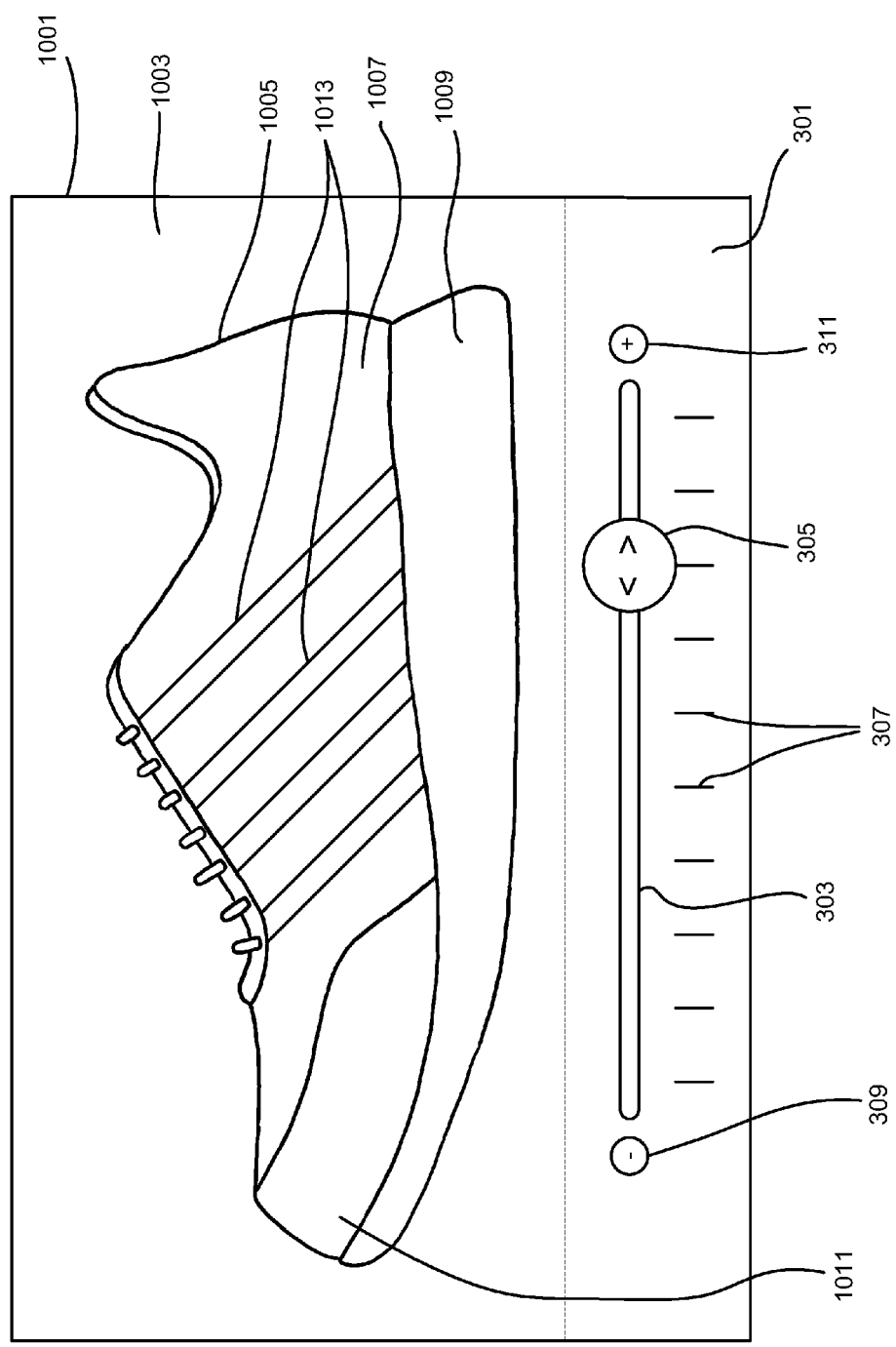
FIGS. 10A and 10B illustrate one example of a user interface for custom-ordering an article that employs an analog-style selection control according to various embodiments of the invention.
Figure 10B:
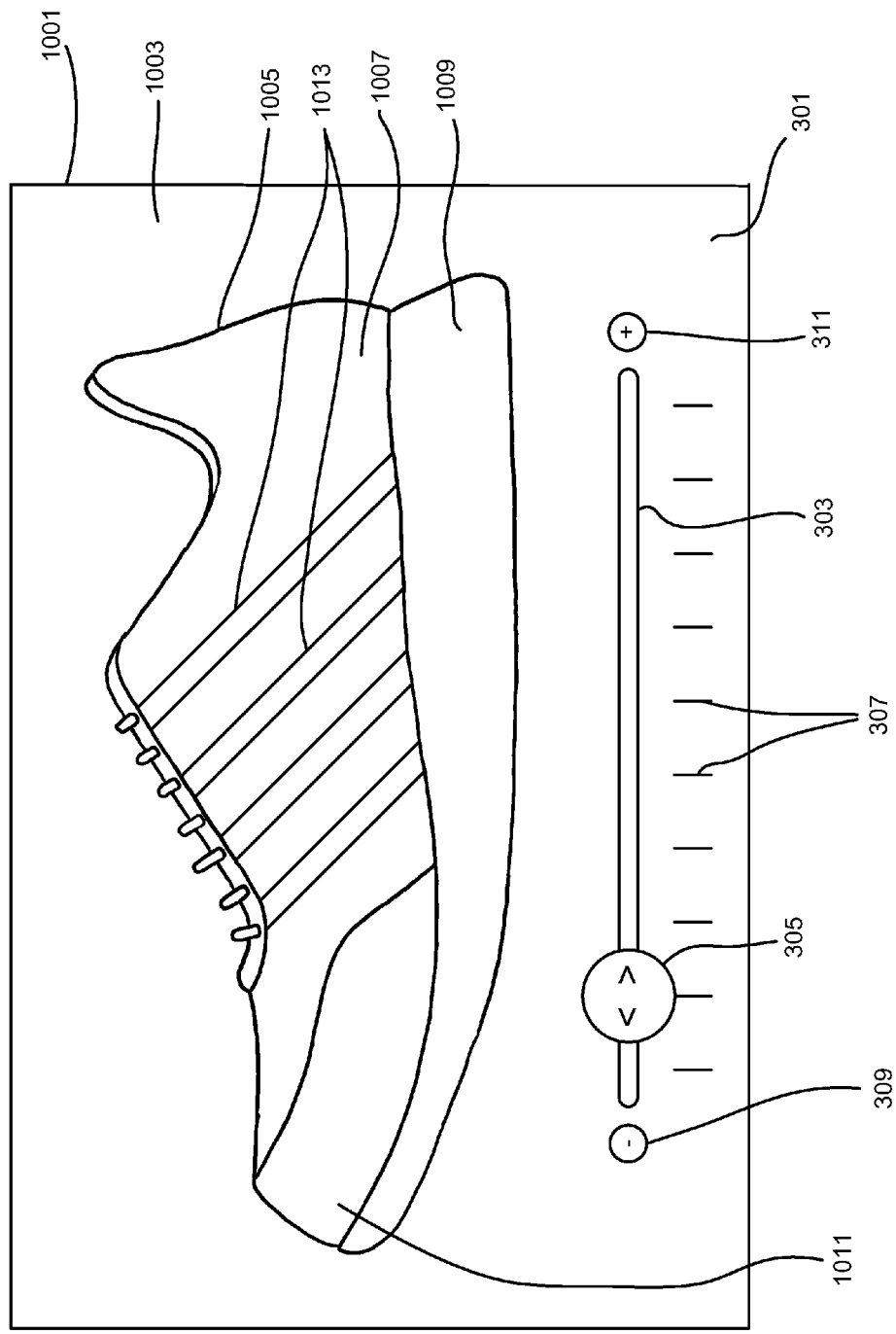

FIGS. 10A and 10B illustrates one example of a user interface for custom-ordering an article that employs an analog-style selection control according to various embodiments of the invention. With this illustrated example, the custom-ordering user interface 1001 is configured to allow a user to custom-order an athletic shoe. More particularly, the custom-ordering user interface 1001 may be employed to select the color characteristics of various features of athletic footwear.

As seen in this figure, the custom-ordering user interface 1001 includes a feature indicator 1003 and the slider selection control 301 discussed in detail above. The feature indicator 1003 displays the features for which characteristics are being selected in the custom-ordering process. As previously noted, the illustrated example of the custom-ordering user interface 1001 is configured to allow a user to custom-order an athletic shoe. Accordingly, the custom-ordering user interface 1001 displays an athletic shoe 1005. It also displays the features of the shoe 1005 for which a user may select a characteristic (i.e., color). Thus, with the illustrated example, the feature indicator 1003 displays the upper 1007, the sole 1009, and the toe guard 1011 of the shoe 1005. The feature indicator 1003 also displays stripes 1013 formed on the surface of the upper 1005.

With some examples of the invention, an analog-style selection control may be used to select the characteristics of a single feature. Thus, with some implementations of the custom-ordering user interface 1001, a user may choose a single feature to customize, such as the stripes 1013. For example, a user may employ an input device, such as a pointing device (e.g., a mouse or touchpad) or keyboard to select the representation of the stripes 1013 in the feature indicator 1003. Alternately, the custom-ordering user interface 1001 may include a list of the available features for which characteristics may be selected. A user can then employ the list to designate that the slider selection control 301 is being used to select a characteristic or characteristics of the stripes 1013. Of course, any desired technique can be used to designate which feature among a group of features will be customized using the slider selection control 301.

Figure 11A:
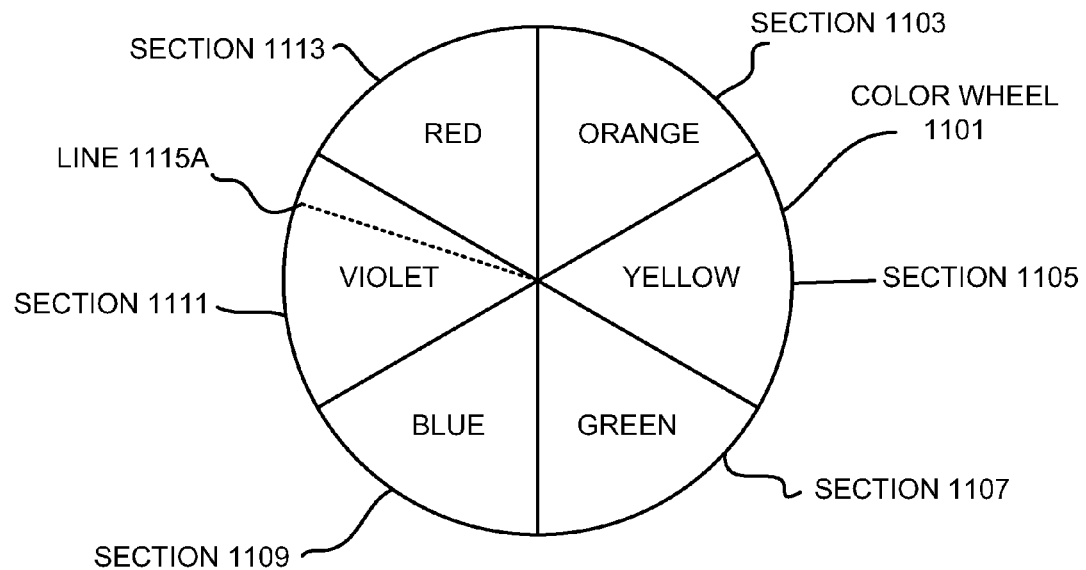
FIGS. 11A, 11B, 12A and 12B illustrate examples of how color wheels may be employed to select a feature's color using an analog-style selection control according to various embodiments of the invention.
Figure 11B:
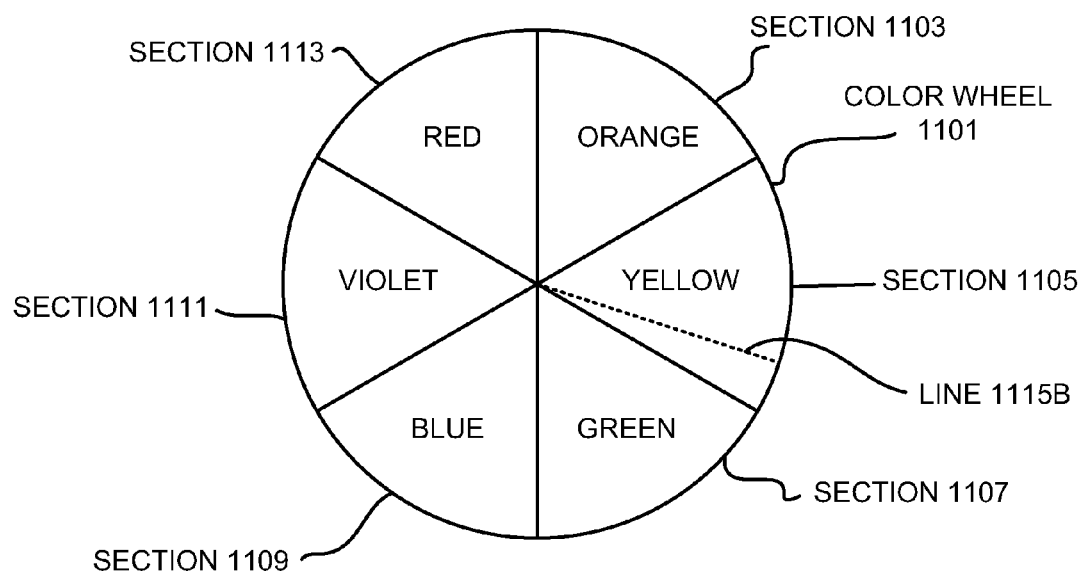

In any case, once the user has indicated that the stripes 1013 are being customized, the user can manipulate the slider selection control 301 to select the desired characteristic or characteristics for the stripes 1013. As previously noted, with the illustrated example, the custom-ordering user interface 1001 can be used to select a color for a designated feature of an athletic shoe. Thus, each location of the linear range indicator 303 may correspond to a different color, such as a color on a color wheel of the type shown in FIGS. 11A and 11B. As seen in these figures, the color wheel 1101 has six sections 1103-1113 corresponding to various shades of the colors orange, yellow, green, blue, violet, and red, respectively. While the sections of the wheel 1101 are labeled with single colors, however, it will be appreciated that the shades of these colors will vary within each section. For example, the shades of the color yellow within section 1105 will vary from an orange-yellow shade at the boundary with section 1103 (i.e., the orange section) to a greenish-yellow shade at the boundary with section 1107 (i.e., the green section).

Accordingly, a user can manipulate the slider selection control 301 to select a color for the stripes 1013. More particularly, by moving the linear position indicator 305 along the linear range indicator 303, a user can select a desired color on the color wheel 1101. For example, in FIG. 10A, the linear position indicator 305 is positioned along the linear range indicator 303 at a location marked by the eighth linear position marker 307. This position might then correspond to an angle 80% of the circumference around the color wheel 1101 (from the top of the color wheel shown in FIG. 11A), i.e., to an angle of 288° as shown by line 1115 in FIG. 11A. Thus, at this position of the linear position indicator 305, the stripes 1013 would have a violet color with a strong red tint.

By moving the position of the linear position indicator 305 along the linear range indicator 303, however, the user can change the color for the stripes 1013. For example, as shown in FIG. 10B, the user could move the position of the linear position indicator 305 to a location along the linear range indicator 303 marked by the second linear position marker 307. This position might then correspond to an angle 20% of the circumference around the color wheel 1101, i.e., to an angle of 72° as shown by line 1117 in FIG. 11B. Thus, at this position of the linear position indicator 305, the stripes 1013 would have a yellow color with a green tint.

With some implementations of the invention, an analog-style selection control may be used to select the characteristics of two more features of an article being custom-ordered. For example, the custom-ordering user interface 1001 may be used to simultaneously select the color of the shoe upper 1007, the toe guard 1011, and the stripes 1013. With this implementation, each location of the linear range indicator 303 may correspond to three different angles on a color wheel 1101, with each angle being separated by 120°. The first angle would then represent a selected color for the shoe upper 1007, the second angle would represent a selected color for the toe guard 1011, and the third angle would represent a selected color for the stripes 1013.

Figure 12A:
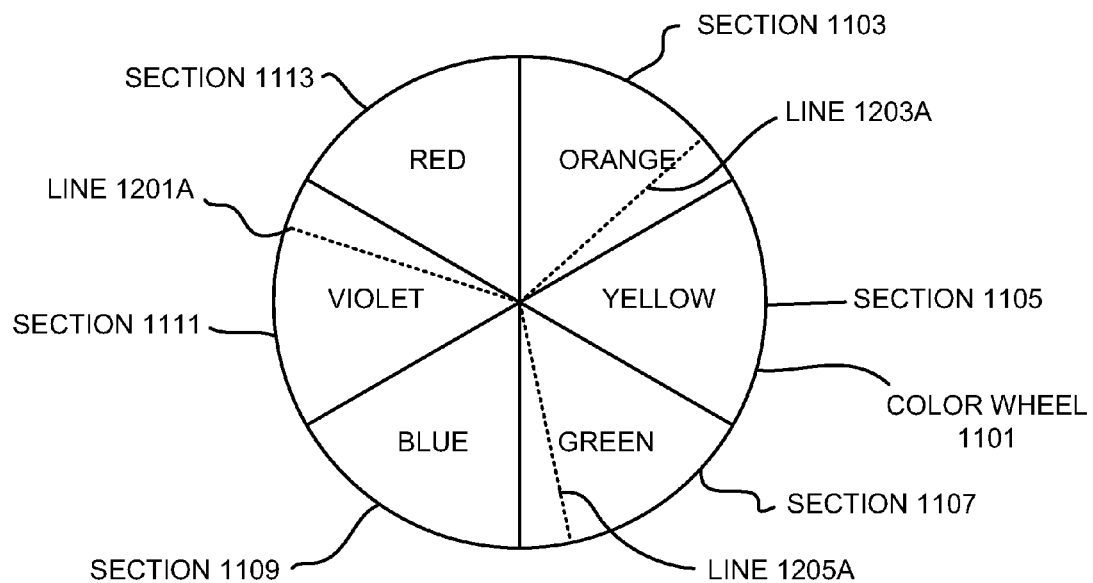

Thus, the position of the linear position indicator 305 shown in FIG. 10A would correspond to angles on the color wheel 1101 marked by lines 1201A, 1203A, and 1205A as shown in FIG. 12A. That is, by positioning the linear position indicator 305 relative to the linear range indicator 303, a user would select the color for the shoe upper 1007 to be the color at the angle of line 1201A on the color wheel 1101, i.e., a violet color with a red tint The user also simultaneously would select the color for the toe guard 1011 to be the color at the angle of line 1203A on the color wheel 1103 (i.e., an orange color with a yellow tint), and the color for the stripes 1013 to be the color at the angle of line 1205A on the color wheel 1103 (i.e., a green color with a blue tint).

Figure 12B:
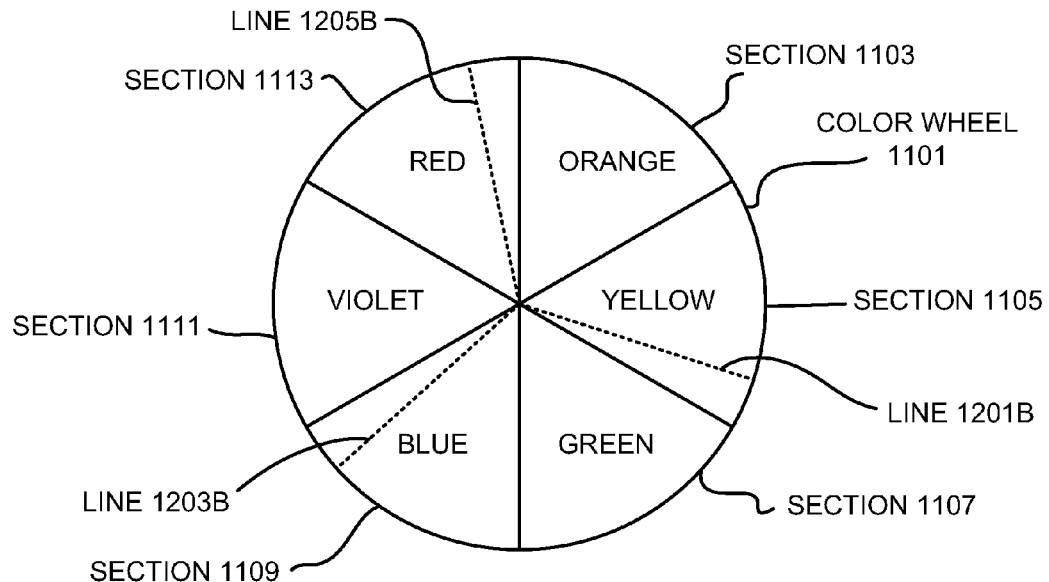

Similarly, the position of the linear position indicator 305 shown in FIG. 10B would correspond to angles 1201B, 1203B, and 1205B shown in FIG. 12B. Thus, by changing the position of the linear position indicator 305 from that shown in FIG. 12A to the location shown in FIG. 12B, a user would change the color selection for the shoe upper 1007 to the color at the angle of line 1201B on the color wheel 1101, i.e., a yellow color with a green tint The user also simultaneously would change the color selection for the toe guard 1011 to be the color at the angle of line 1203B on the color wheel 1101 (i.e., an blue color with a violet tint) and the color for the stripes 1013 to be the color at the angle of line 1205B on the color wheel 1101 (i.e., a red color with an orange tint).

Figure 13A:
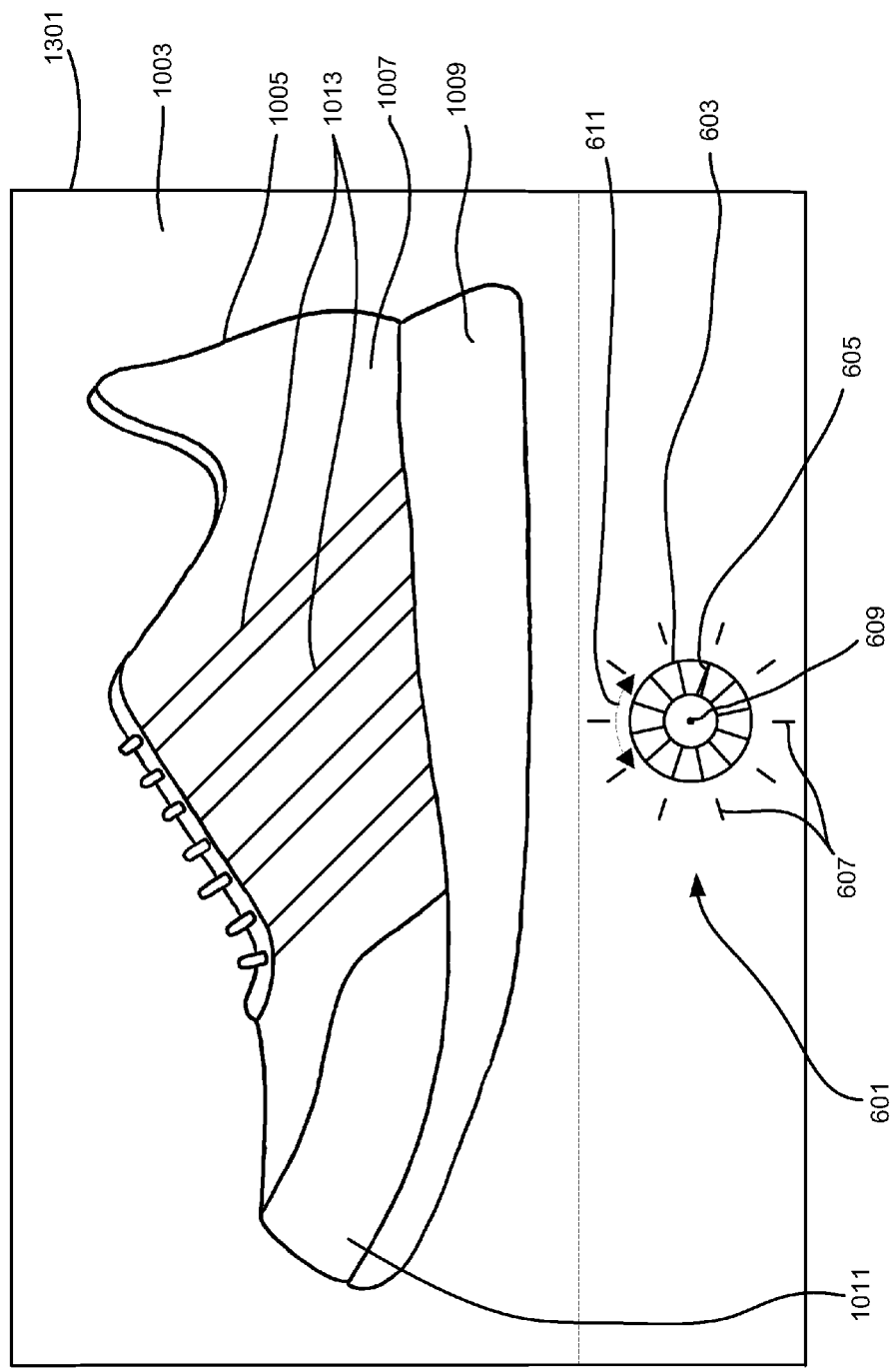
FIGS. 13A and 13B illustrate another example of a user interface for custom-ordering an article that employs an analog-style selection control according to various embodiments of the invention.

FIG. 13A illustrates yet another embodiment of the invention. This figure illustrates a custom ordering interface 1301 for selecting one or more feature characteristics of an athletic shoe. Unlike the custom ordering interface 1001 shown in FIGS. 10A and 10B, however, the custom ordering interface 1301 includes the angular selection control 601 rather than the slider selection control 301. As explained above, with this dial-type selection control, a user can select characteristic information for one or more features of an article by designating an angular position for the angular position indicator 603 (shown by the current position marker 605). Thus, as with the previously discussed examples, the position of the angular selection control 601 may correspond to an angle on the color wheel 1101.

Figure 13B:
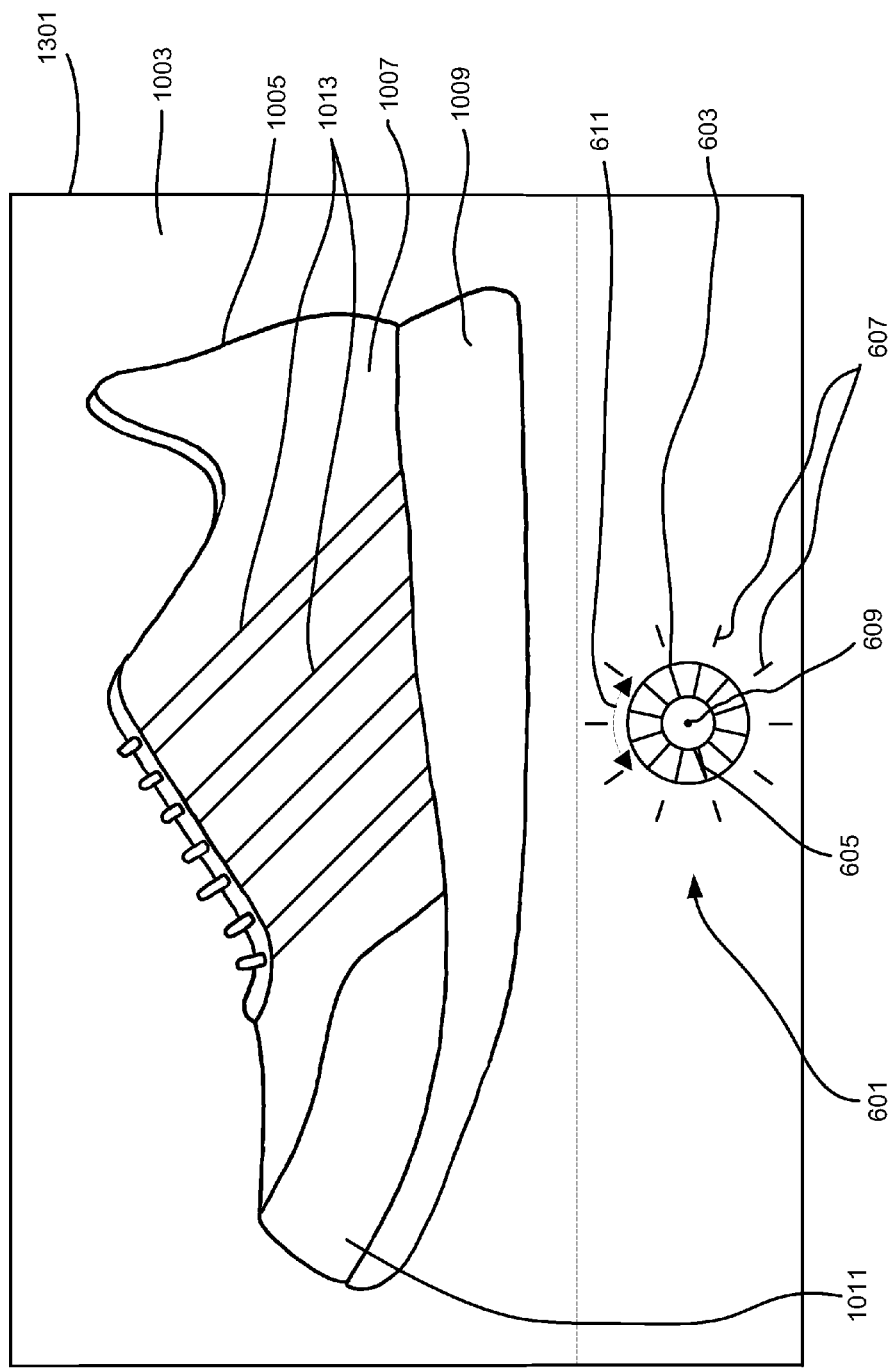
Figure 14A:
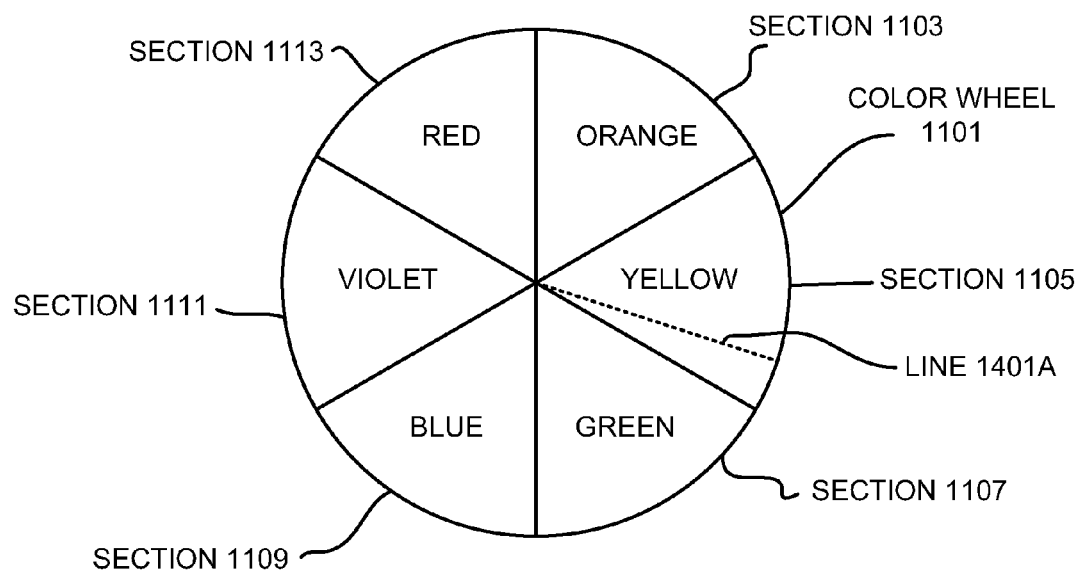
FIGS. 14A, 14B, 15A, 15B, 16A, 16B, 16C, and 16D illustrate examples of how color wheels may be employed to select a feature's color using an analog-style selection control according to various embodiments of the invention.
Figure 14B:
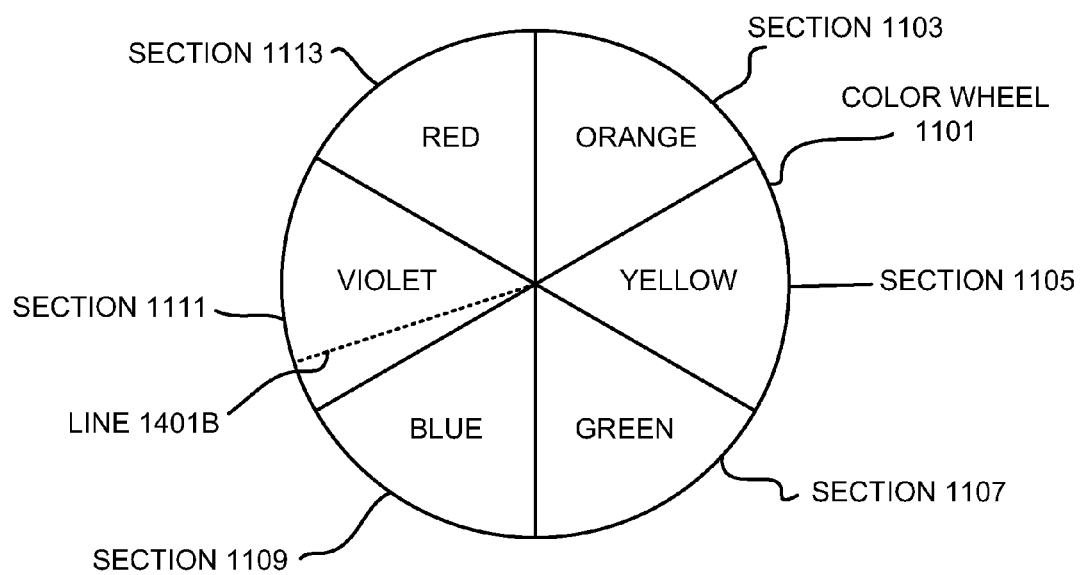

With some embodiments of the invention, 1° of rotation of the angular position indicator 603 will correspond to an angle increase of 1° on the color wheel 1101. For example, as shown in FIG. 13A, there are ten angular position markers 607 around the angular position indicator 603, so that each angular position marker 607 marks an additional 36° of rotation. As also seen in FIG. 13A, the current position marker 605 is pointing to the third angular position marker 607, indicating that the angular position indicator 603 has been rotated about 108° (where the uppermost angular position marker 607 shown in the figure marks a rotation of 0°). As shown in FIG. 14A, this corresponds to the same angle of 108° on the color wheel 1101. Accordingly, the designated shoe feature being customized by the user (e.g., the shoe upper 1007, the sole 1009, the toe guard 1011, the stripes 1013, etc.) will have a yellow color with a green tint, as indicated by line 1401A. Likewise, if the user rotates the angular position indicator 603 to the position shown in FIG. 13B (with the current position marker 605 pointing toward the seventh angular position marker 607 at an angle of 252°), then the selected color of the designated shoe feature will change to a violet color with a blue tint, as indicated by line 1401B at an angle of 252° on the color wheel 1301 in FIG. 14B.

Figure 15A:
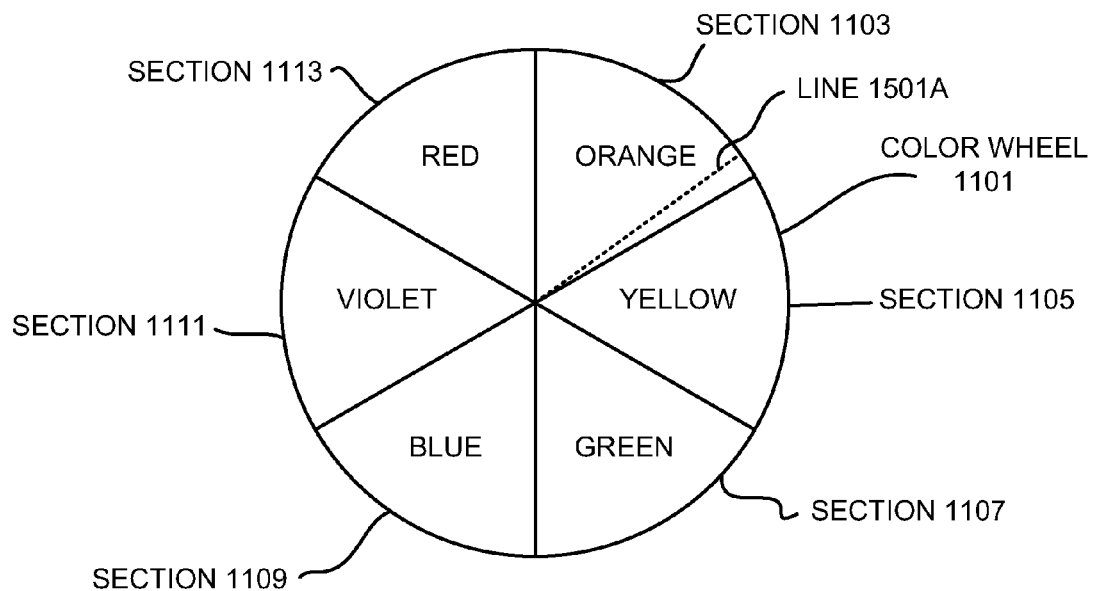
Figure 15B:
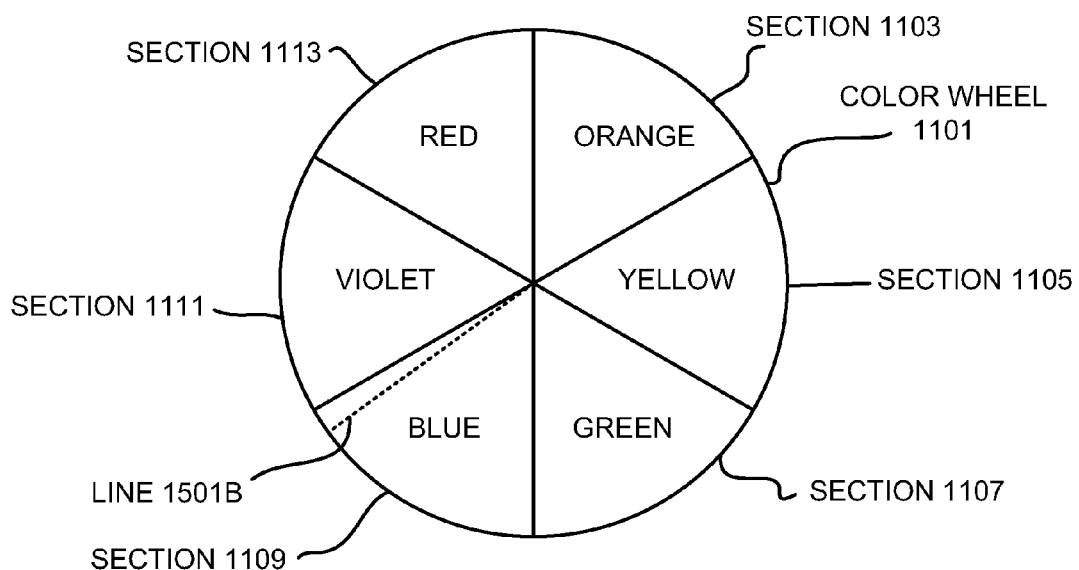

Unlike the slider selection control 301, however, a dial-type selection control can have an infinite number of positions. For example, with the angular selection control 601, the angular position indicator 603 can be rotated around its axis 609 more than once. Thus, with some embodiments of the invention, a 2° of rotation of the angular position indicator 603 may correspond to an increase of only a 1° angle on the color wheel 1101. With these embodiments, a user would need to rotate the angular position indicator 603 two entire revolutions to correspond with one revolution around the color wheel 1101. Accordingly, if the angular position of the current position marker 605 shown in FIG. 13A occurs during the first rotation of the angular position indicator 603, then this angular position would correspond to an angle of 54° on the color wheel 1101, as shown in FIG. 15A. The designated shoe feature being customized by the user (e.g., the shoe upper 1007, the sole 1009, the toe guard 1011, the stripes 1013, etc.) will then have an orange color with a strong yellow tint, as indicated by line 1501A. Likewise, if the angular position of the current position marker 605 shown in FIG. 13A occurs during the second rotation of the angular position indicator 603, then this angular position would correspond to an angle of 234° on the color wheel 1101, as shown in FIG. 15B. This new position would thus change the selected color of the designated shoe feature to a blue color with a strong violet tint, as indicated by line 1501B in FIG. 15B.

Figure 16A:
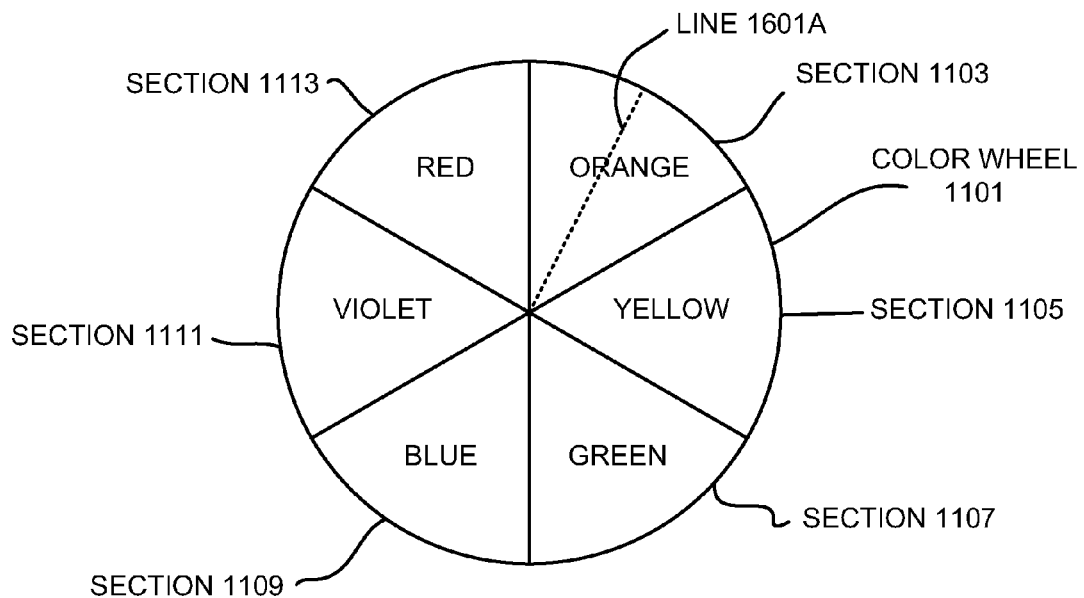
Figure 16B:
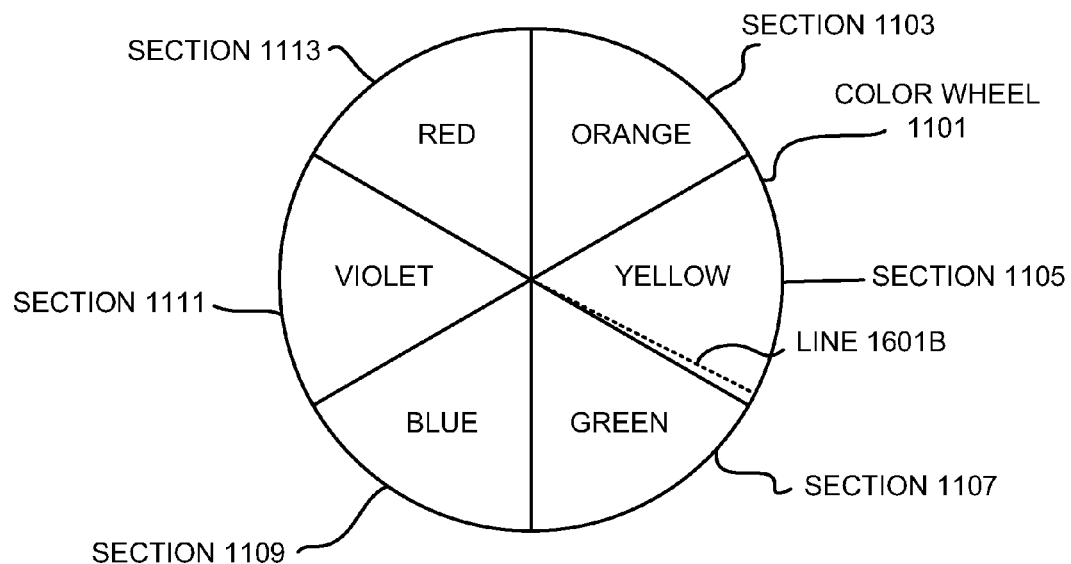

As another example, with some embodiments of the invention, 4° of rotation of the angular position indicator 603 may correspond to an increase of only a 1° angle on the color wheel 1101. With these embodiments, a user would need to rotate the angular position indicator 603 four entire revolutions to correspond with one revolution around the color wheel 1101. Accordingly, if the angular position of the current position marker 605 shown in FIG. 13A occurs during the first rotation of the angular position indicator 603, then this then this angular position would correspond to an angle of 27° on the color wheel 1101, as shown in FIG. 16A. The designated shoe feature being customized by the user (e.g., the shoe upper 1007, the sole 1009, the toe guard 1011, the stripes 1013, etc.) will then have an orange color, as indicated by line 1601A. If the angular position of the current position marker 605 shown in FIG. 13A occurs during the second rotation of the angular position indicator 603, then this angular position would correspond to an angle of 117° on the color wheel 1101, as shown in FIG. 16B. This new position would thus change the selected color of the designated shoe feature to a yellow color with a very strong green tint, as indicated by line 1601B in FIG. 16B.

Figure 16C:
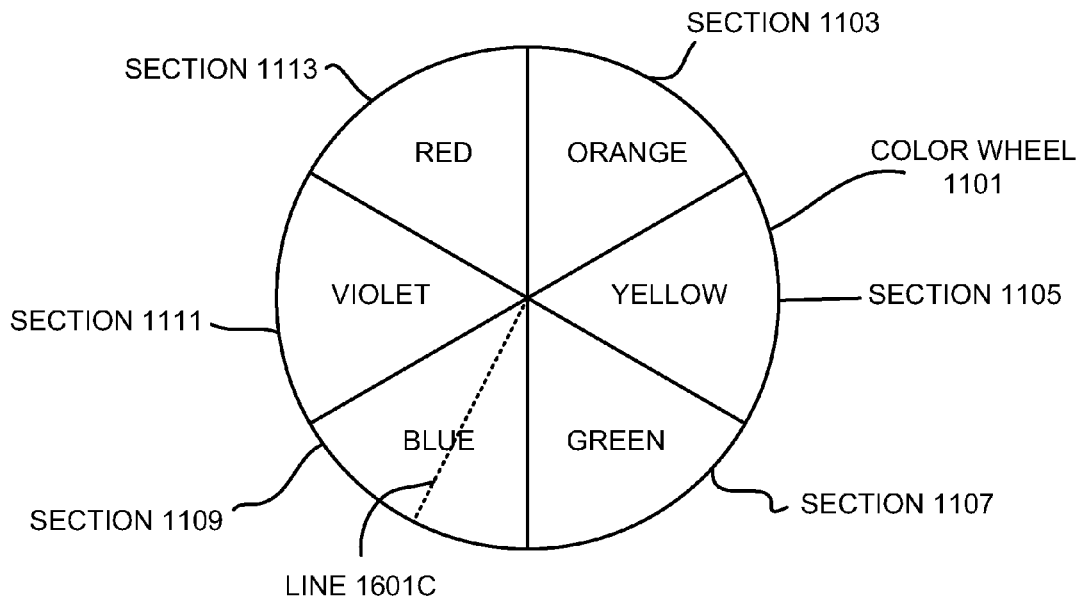
Figure 16D:
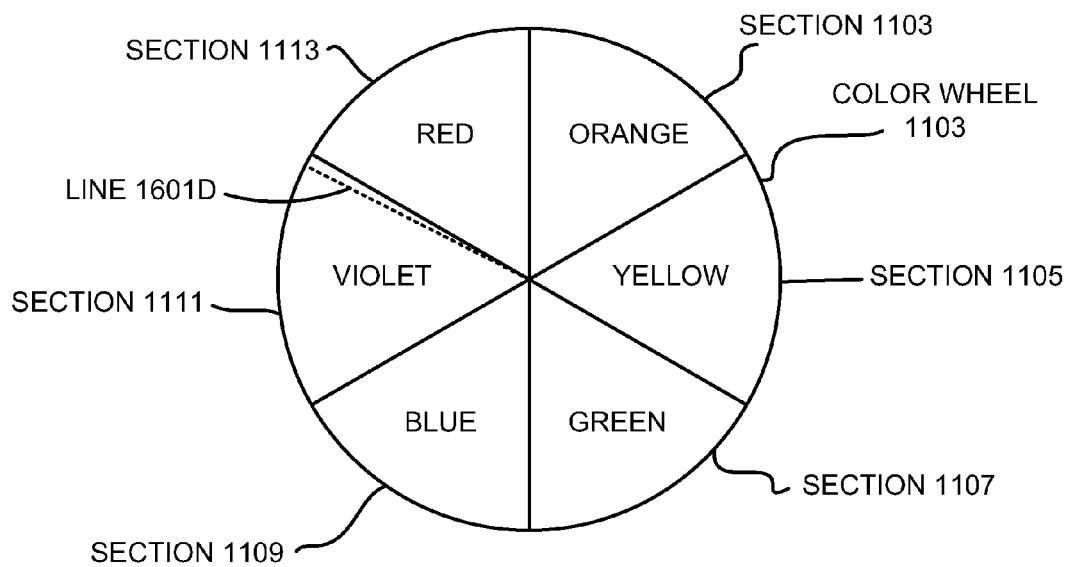

Further, if the angular position of the current position marker 605 shown in FIG. 13A occurs during the third rotation of the angular position indicator 603, then this angular position would correspond to an angle of 207° on the color wheel 1101, as shown in FIG. 16C. This new position would thus change the selected color of the designated shoe feature to a blue color, as indicated by line 1601C. Lastly, if the angular position of the current position marker 605 shown in FIG. 13A occurs during the fourth rotation of the angular position indicator 603, then this angular position would correspond to an angle of 297° on the color wheel 1101, as shown in FIG. 16D. This new position would thus change the selected color of the designated shoe feature to a violet color with a very strong red tent, as indicated by line 1601D.

Of course, with some examples of the invention, 1° of rotation of the angular position indicator 603 may correspond to less than a 1° angle on the color wheel 1101. For example, rotating the angular position indicator 603 a full 360° may cycle through two rotations of the color wheel 1101. With some examples, the second rotation of the color wheel may begin at the same starting point as the first rotation, and continue in the same direction. With alternate examples, however, the second rotation of the color wheel 1101 may continue in an opposite direction from the first rotation.

Figure 17:
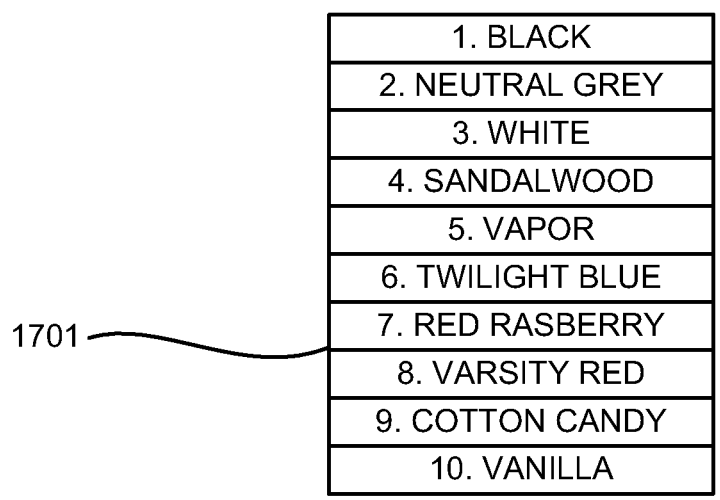
FIG. 17 illustrates to a list of colors from which a feature color may be selected according to various embodiments of the invention.

Also, while the use of various embodiments of the invention with a color wheel have been described above for ease of understanding, it should be appreciated that an analog-style selection can be used to select a color using any desired color/position indicator relationship. For example, the slider selection control 301 shown in FIGS. 10A and 10B can be used simply to select a feature color from among a list of colors, such as the list 1701 illustrated in FIG. 17. Thus, with this implementation, each of the ten linear position markers 307 may correspond to a different color in the table 1701. Of course, these examples are given only to provide a better understanding of the wide range and variety of ways in which examples of the invention may be implemented. For example, alternate implementations of the invention may use an analog-style selection tool to select a feature color according to any desired relationship, such as Pantone® color chart, a random ordering of colors, and even a simple list of colors available for use by a manufacturer.

Further, while representative uses of an analog-style selection tool have been described above with respect to color selection, it should be appreciated that alternate embodiments of the invention may employ an analog-style selection tool to permit a user to select any desired feature characteristic for a custom-ordered article. For example, if the article being custom-ordered is footwear, then some embodiments of the invention may provide an analog-style selection tool for a user to select, e.g., an amount of cushioning for the sole, the footwear's width at one or more locations, the footwear's length, the footwear's stability, etc.

Moreover, while specific implementations of the invention have been discussed with regard to footwear, it should be appreciated that various embodiments of the invention can be employed to allow a user to custom-order any desired article. For example, with various embodiments of the invention, an analog-style selection control may be provided to allow a user to select, e.g., a color of a watch face, a length of a handbag strap, a suspension setting of an automobile or motorcycle, a flavor strength of a soft drink, a loft angle of a golf club head, or an image that will be emblazoned on an article of clothing. As will be discussed in more detail below, with various examples of the invention an analog-style selection control even may be used to select an amount of an image that will be emblazoned on a custom-ordered article, such as an article of clothing like a shirt or footwear.

It also should be appreciated that, while a few specific examples of analog-style selection controls have been described above to provide a clear understanding of the invention, any type of analog-style selection control can be employed according to various embodiments of the invention. Thus, some embodiments of the invention may share one or more features of the analog-style selection controls discussed in detail above, while other embodiments of the invention may share none of these features. Also, while linear and rotational type analog-style selection controls have been discussed, any type of analog-style selection control may be employed to select feature characteristics according to various embodiments of the invention. For example, some implementations of the invention may employ a temporal analog-style selection control. With this type of analog-style selection control, a user may, e.g., depress a button, such a key on a keyboard, to select a feature characteristic. The duration of the depression time will then determine the selected characteristic.

As will be appreciated by those of ordinary skill in the art, if an embodiment of the invention implements an analog-style selection control using a binary programmable computing device (such as a conventional desktop computer), then the analog-style selection control may not actually have a true analog operation. That is, rather than providing an infinite choice of selection values within a given range, the analog-style selection control may actually provide only a discrete number of different selection values within its range. With some implementations of an analog-style selection control according to the invention, the number of available selection values may generally correspond to the number of available feature characteristics. For example, a radial selection control may provide 2048 different selection values to choose a color on a color wheel having 2048 different color shades. With these implementations, the operation of the analog-style selection control will appear, to an observing user, to closely resemble the operation of a true analog selection control.

For still other implementations of an analog-style selection control according to the invention, however, the number of available selection values may not correspond very well to the number of available feature characteristics. For example, a slider selection control may provide 4096 different selection values to choose a color from a list of only ten different colors. With these implementations, the analog-style selection control may have a range of selection values that correspond to a single selection. Alternately, the analog-style selection control may have a "snap" feature that causes the position indicator to "snap" to the closest position corresponding to an available feature characteristic. For example, with the slider selection control 301 illustrated in FIGS. 10A and 10B, each of the ten positions marked by a linear position marker 307 may correspond to a specific color in a list of ten available colors. If a user positioned the linear position indicator 305 between two linear position markers 307, then the slider selection control 301 would "snap" the linear position indicator 305 to the position on the linear range indicator 303 marked by the closest linear position marker 307.

Various embodiments of the invention, however, may implement an analog-style selection control with an actual analog operation. For example, some embodiments of the invention may be implemented on an analog computing device, such as an optical processor computer. Other embodiments of the invention may employ a true analog selection control in conjunction with a conventional computing device. For example, embodiments of the invention may be implemented in a specially-built environment, such as a kiosk. With these embodiments, a physical analog selection control, such as a dial connected to a potentiometer, can be used instead of a representation of an analog-style selection control displayed in a graphical user interface.

Thus, it should be appreciated that, as used herein, the term "analog-style selection control" refers both to true analog selection controls and discrete selection controls that have the appearance and feel of a true analog selection control. As noted above, for many users the overall "feel" of this type of selection control will be more convenient and intuitive than a discrete-style selection control.

Emblazoned Images

As noted above, some embodiments of the invention relate to techniques for custom-ordering articles having images emblazoned on them. More particularly, various implementations of the invention provide a user with the ability to specify one or more size characteristics for an image that will appear on a custom-ordered article. Some embodiments of the invention, for example, may allow a user to specify a complexity of the image, the total area encompassed by the image, or the ratio of the area of the image to a remaining area of the article.

Referring back to FIG. 2, the custom ordering tool 201 includes an interface management module 203, a control module 205, and a display module 209. With various examples of the invention relating to the selection of a size for an image to be emblazoned on a custom-ordered article, the control module 205 may specifically provide a size selection control for selecting a size of an image. The size selection control may be an analog-style selection control, as discussed in detail above. With some examples of the invention, however, the size selection control alternately may be a discrete-style selection control, as also discussed above. The display module 209 then displays a custom ordering user interface, including a visual display of the size selection control, to the user via a display monitor 117A.

By using an input device 115, such as a mouse, touchpad or keyboard, a user can input information to the control module through the size selection control specifying the size of an image to be emblazoned on a custom ordered article. More particularly, a user can manipulate the size selection control to input size selection information for selecting one or more size characteristics for an image feature of an article being custom ordered. In response, the control module 205 provides the received size selection information to the interface management module 203. The interface management module 203 may then relay display information, corresponding to the received selection information, to the display module 209, which then updates the appearance of the size selection control. In this manner, the user can receive immediate visual feedback of the selection information he or she has input to the size selection control.

In addition to optionally providing the input selection information to the display module 209, the interface management module 203 will also provide the size selection information to a retailer or manufacturer providing the article being custom ordered. For example, with some embodiments of the invention, the custom ordering tool 201 may electronically relay the size selection information directly to a server computer maintained by a retailer or manufacturer. With still other examples of the invention, however, the custom ordering tool 201 may instead store the user's input size selection information in a memory, until it can be retrieved, either physically or electronically, by a retailer or manufacturer.

If the size information is being provided to a retailer, for example, the retailer can review its stock and select an article that has the feature characteristics specified by the user. Similarly, if the information is being provided to a manufacturer, the manufacturer may employ the selection information to manufacture a new article that has the feature characteristics specified by the user. With some examples of the invention, the interface management module 203 may continuously provide a retailer or manufacturer with the user's input size selection data. Alternately, the interface management module 203 may only provide the user's size selection data to a retailer or manufacturer after the user has indicated that the input selection data is a final set of ordering data. For example, if the user is purchasing a custom-ordered article, the interface management module 203 may postpone providing the user's image size selection information to a retailer or manufacturer until after the user also has provided the custom ordering tool 201 with purchasing information, such as a credit card account information or electronic payment service account information.

While the interface management module 203, the control module 205 and the display module 209 are illustrated as discrete modules in FIG. 2, alternate embodiments of the invention may combine two or even all three of these modules into a single unit as previously noted. It also should be appreciated that, with still other examples of the invention, the custom-ordering tool 201 may include one or more components to display other elements in the user interface. For example, some implementations of the invention may additionally include components for displaying an image of one or more features of the article being custom-ordered. When the user provides new selection information, these components will use the selection information to update the appearance of the article's features to reflect the new selection information.

As will be discussed in more detail below, various embodiments of the invention allow a user to select one or more size characteristics for an image feature. For example, some embodiments of the invention allow a user to specify a scaled size of an image, while other embodiments of the invention allow a user to specify the geographical size of the image (e.g., its width and length). Other examples of the invention permit a user to designate a thickness of lines used to create the image, or to specify the density of the image (i.e., the amount of the article covered by the image per a unit area). Still other embodiments of the invention allow a user to designate the absolute size of the image (i.e., the total amount of the article's surface covered by the image). Some embodiments of the invention may then allow a user to designate one or more of each of these size characteristic for an image.

Figure 18A:
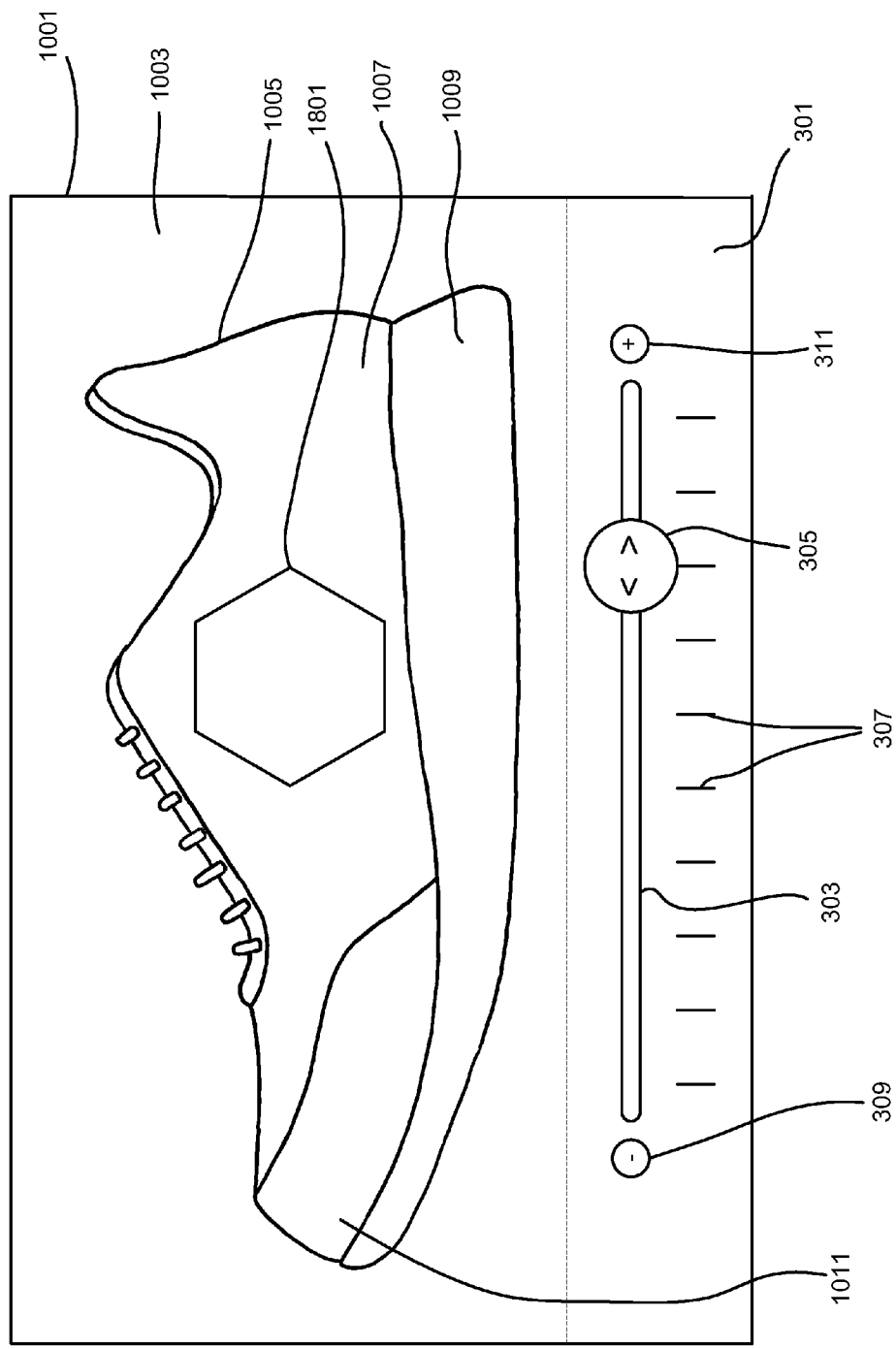
FIGS. 18A and 18B illustrate an example of a custom-ordering user interface configured for specifying the scaled size of an image according to various embodiments of the invention.

Referring now to FIG. 18A, this figure illustrates an example of the custom-ordering user interface 1001 configured for specifying the scaled size of an image according to various embodiments of the invention. As previously explained, the custom-ordering user interface 1001 includes a feature indicator 1003 and the slider selection control 301 discussed in detail above. The feature indicator 1003 displays the features for which characteristics are being selected in the custom-ordering process. With this illustrated example, the custom-ordering user interface 1001 is configured to allow a user to designate the size of an image that will be emblazoned on a custom-ordered athletic shoe. Accordingly, the custom-ordering user interface 1001 displays an athletic shoe 1005. It also displays the image 1801 for which a user may select the size characteristics. In FIG. 18A, the image 1801 is shown as a hexagon, but it should be appreciated that this is merely representative, and various examples of the invention may be configured to allow a user to select the scaled size of any desired image.

Figure 18B:
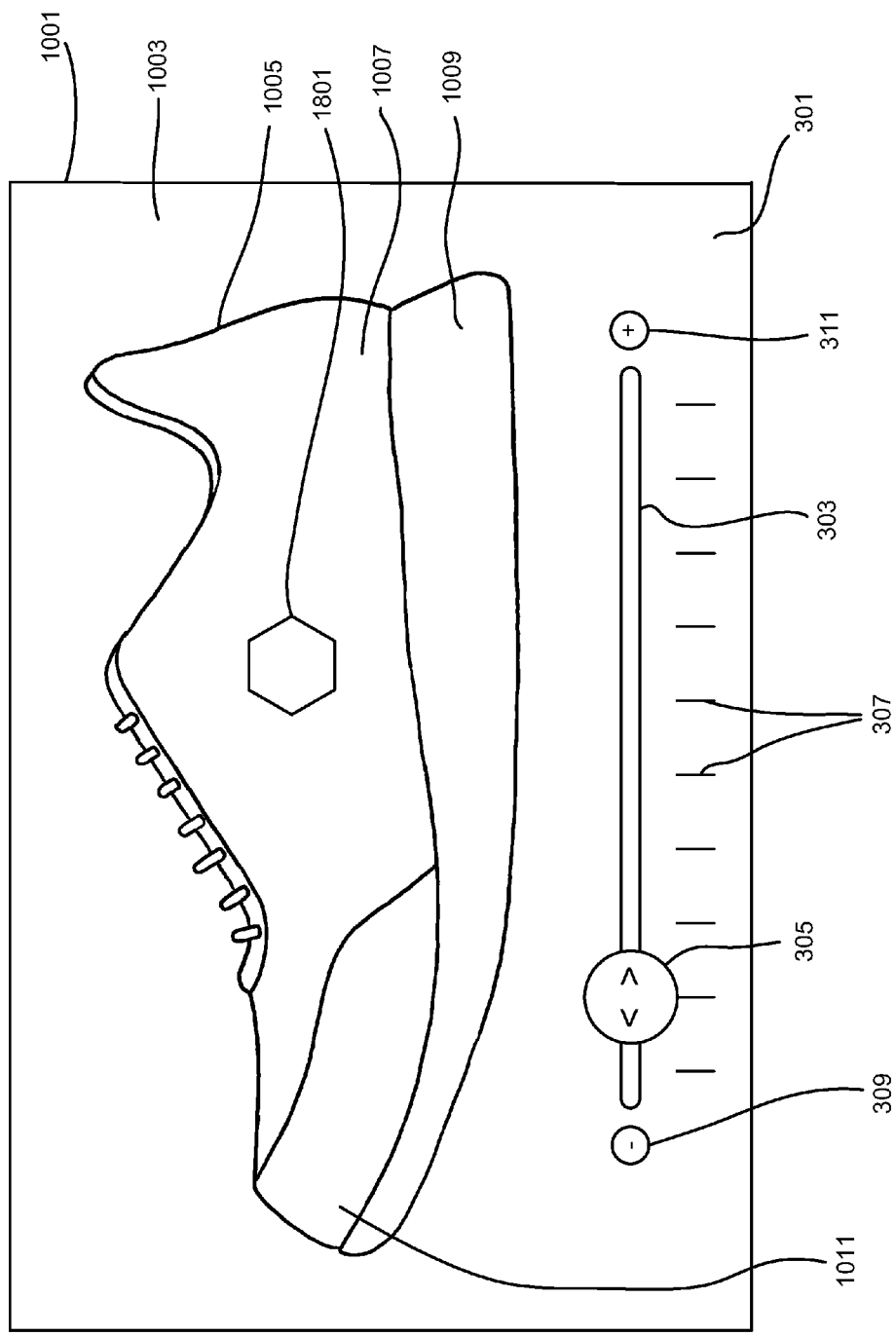

As will be apparent from the foregoing discussion, a user can change the scaled size of the image 1801 by manipulating the slider selection control 301 to select a desired scaled size for the image 1801. In FIG. 18A, the linear position indicator 305 is located along the linear range indicator 303 at a position corresponding to the eighth linear position marker 307. If the user repositions the linear position indicator 305 closer to the positive direction indicator 311 (i.e., to a "greater" or "larger" position), then the scaled size of the image 1801 will be increased. Similarly, if the user repositions the linear position indicator 305 closer to the negative direction indicator 309 (i.e., to a "smaller" or "lower" position), then the scaled size of the image 1801 will be reduced. For example, FIG. 18B illustrates the smaller scaled size of the image 1801 when the linear position indicator 305 is located along the linear range indicator 303 at a position corresponding to the second linear position marker 307. The image 1801 has the same shape and is located at the same position as in FIG. 18A, but the size of each dimension of the image 1801 is proportionally smaller.

Figure 19A:
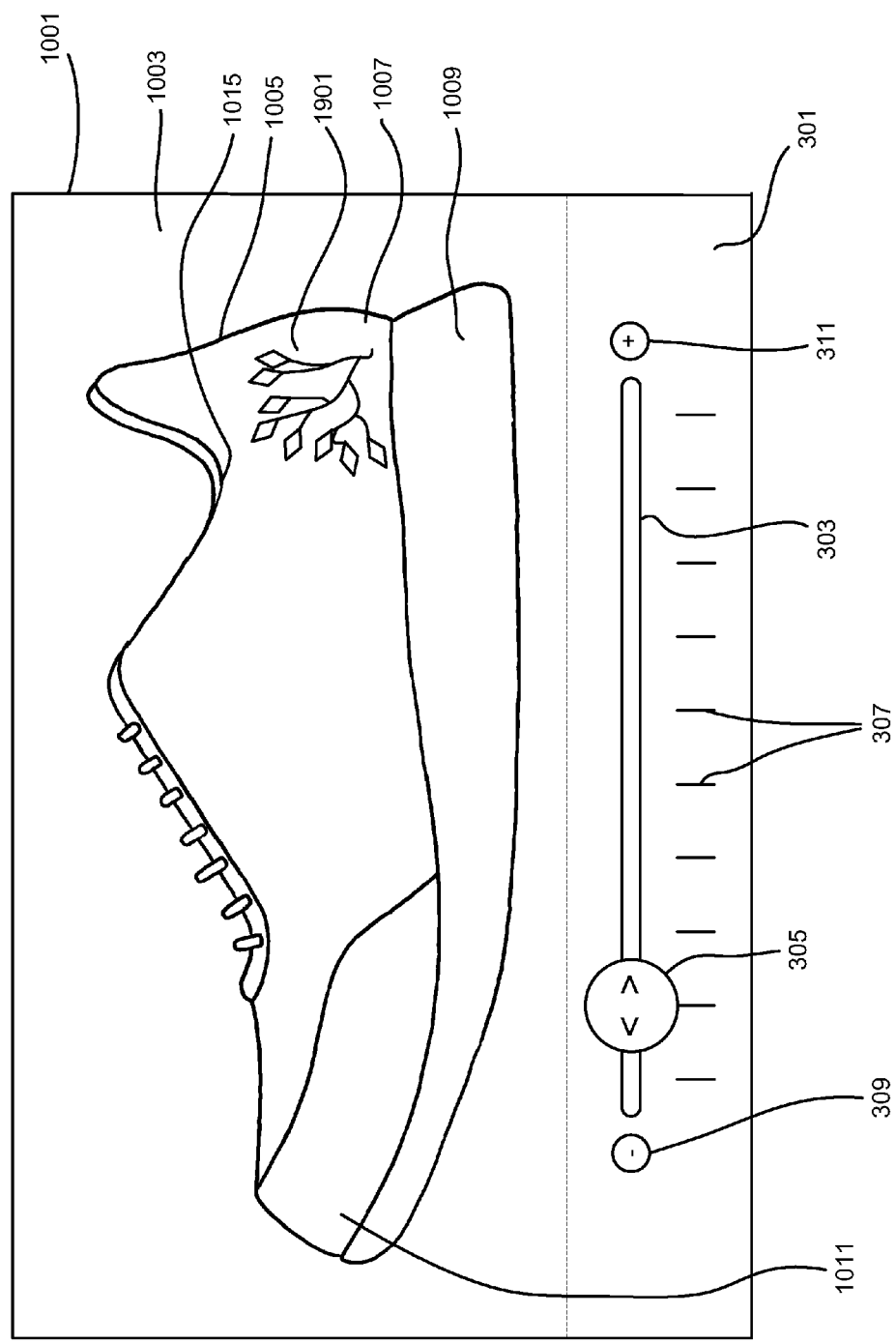
FIGS. 19A and 19B illustrate an example of a custom-ordering user interface configured to select the geographical size of an image according to various embodiments of the invention.

Referring now to FIG. 19A, this figure illustrates an example of the custom-ordering user interface 1001 being configured to select the geographical size of an image according to various embodiments of the invention. Again, the custom-ordering user interface 1001 includes a feature indicator 1003, which displays the features for which characteristics are being selected in the custom-ordering process, and the slider selection control 301. With this illustrated example, the custom-ordering user interface 1001 is configured to allow a user to designate the geographical size of an image that will be emblazoned on a custom-ordered athletic shoe. The custom-ordering user interface 1001 thus displays an athletic shoe 1005 with an image 1901. As seen in FIG. 19A, the image 1901 is an abstract pattern resembling a vine, but it should be appreciated that this particular image is merely a representative image, and various examples of the invention may be configured to allow a user to select the geographical size of any desired image.

As with previously discussed embodiments of the invention, a user can manipulate the slider selection control 301 to select a desired size for the image 1901. With the illustrated example, however, the selected size will be the geographical size of the image 1901. As used herein, the term geographical size refers to the total amount of geographical area encompassed by the image 1901. That is, the geographical area is the total contiguous surface area of the article in which at least a portion of the image appears. For example, in FIG. 18A the linear position indicator 305 is located along the linear range indicator 303 at a position corresponding to the second linear position marker 307. Thus, the image 1901 occupies only a small area of the shoe 1005, extending vertically from approximately the sole 1009 to the lowest portion of the ankle hole 1015, and extending horizontally from the back of the heel to the lowest portion of the ankle hole 1015.

Figure 19B:
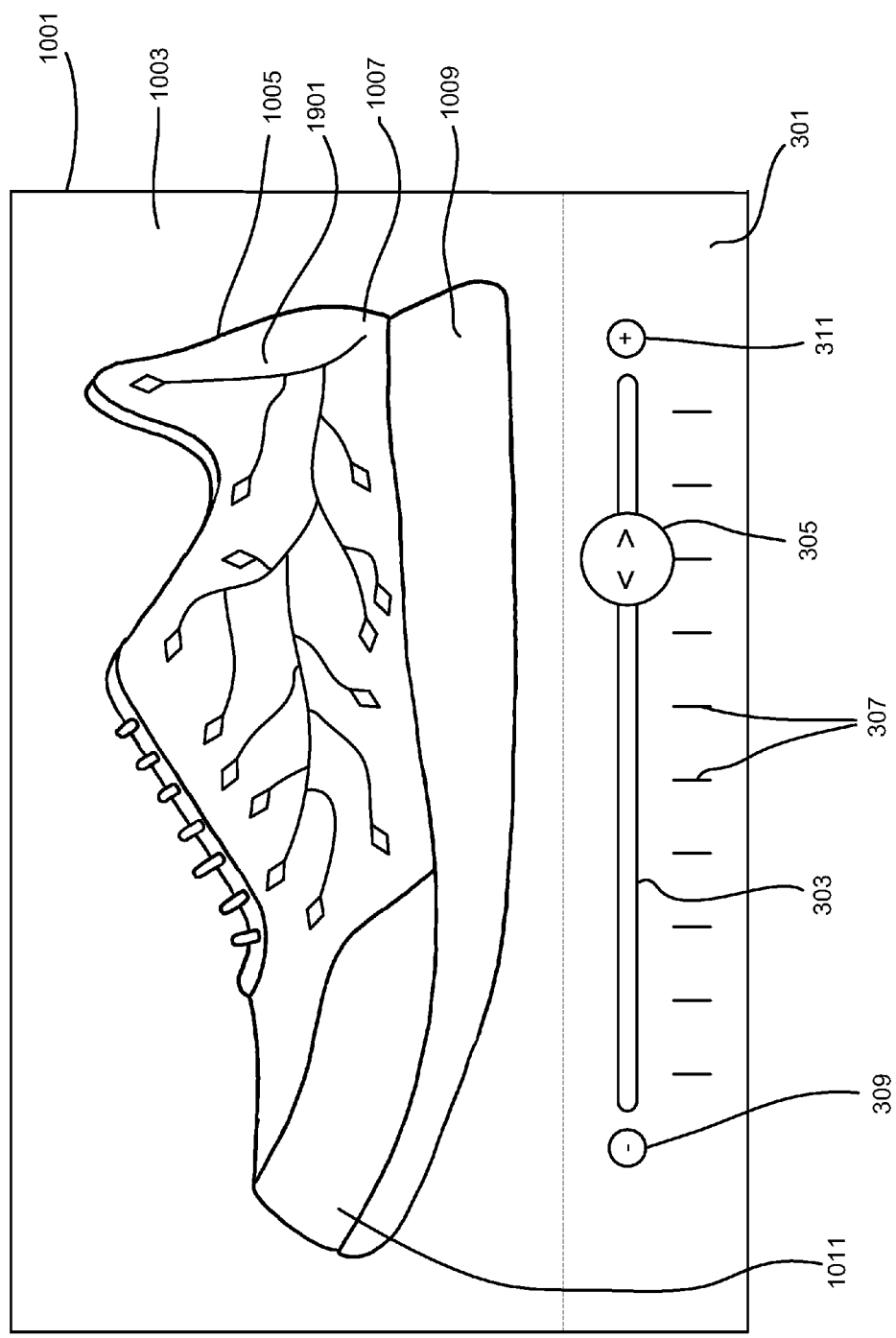

If the user moves the linear position indicator 305 closer to the negative direction indicator 309 (i.e., to a "smaller" or "lower" position), then the geographical size of the image 1901 will be reduced. Similarly, if the user moves the linear position indicator 305 closer to the positive direction indicator 311 (i.e., to a "greater" or "larger" position), then the geographical size of the image 1901 will be increased. For example, FIG. 19B illustrates the larger geographical size of the image 1901 when the linear position indicator 305 is located along the linear range indicator 303 at a position corresponding to the eighth linear position marker 307. As seen in this figure, the image 1901 extends across a much larger surface area of the shoe 1001. More particularly, the image 1901 extends horizontally from the heel to the start of the toe guard 1101, and extends vertically from the sole 1009 to the top of the upper 1007.

Figure 20A:
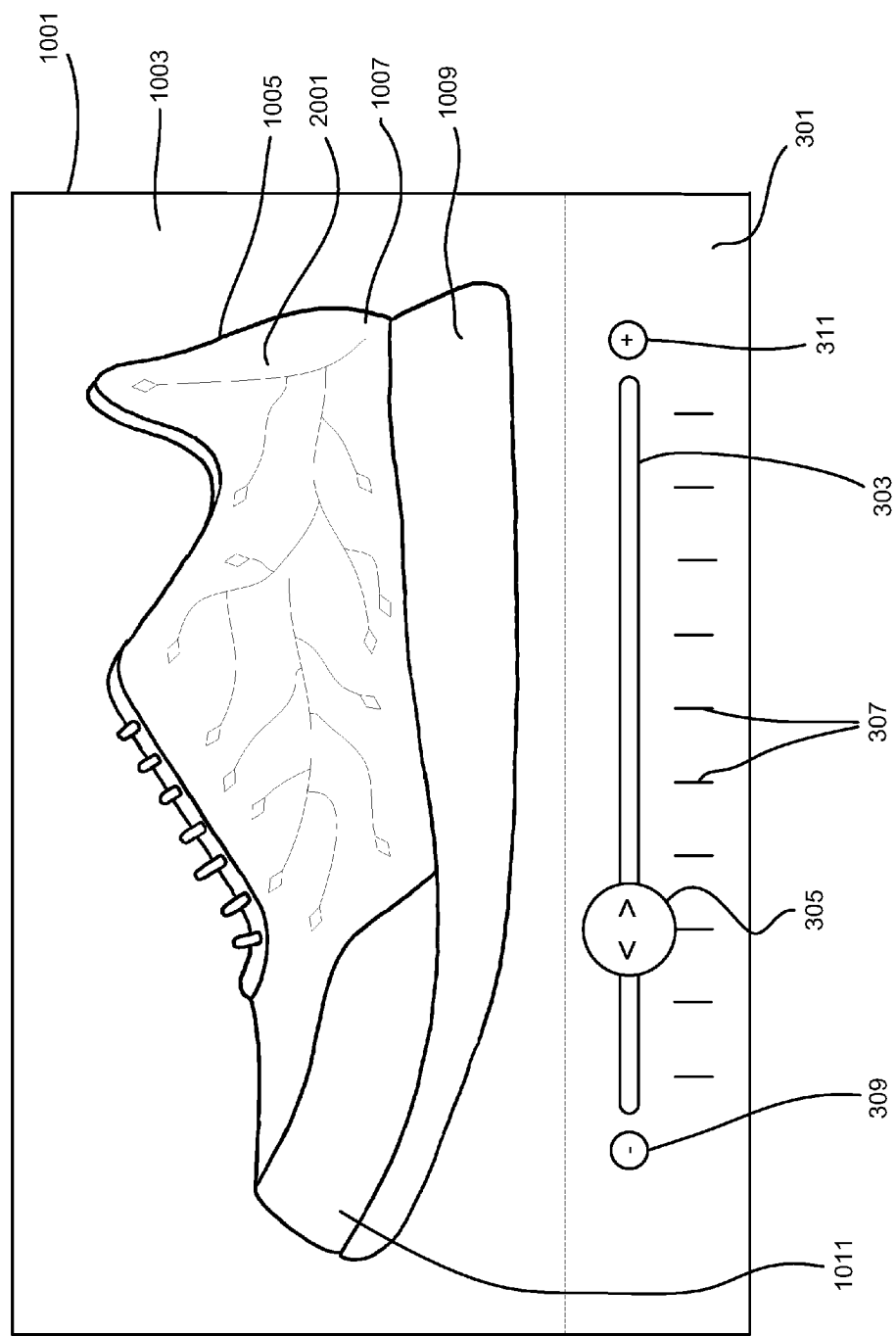
FIGS. 20A and 20B illustrate an example of a custom-ordering user interface configured for specifying the line size of an image according to various embodiments of the invention.

FIG. 20A illustrates an example of the custom-ordering user interface 1001 configured for specifying the line size of an image according to various embodiments of the invention. Again, the custom-ordering user interface 1001 includes a feature indicator 1003 and the slider selection control 301. With this illustrated example, however, the custom-ordering user interface 1001 is configured to allow a user to designate the size of the lines making up an image that will be emblazoned on a custom-ordered athletic shoe. Thus, the custom-ordering user interface 1001 displays an athletic shoe 1005 with an image 2001. In FIG. 20A, the image 2001 is an abstract pattern resembling a vine, but it should be appreciated that this is merely a representative image, and various examples of the invention may be configured to allow a user to select the scaled size of any desired image.

Figure 20B:
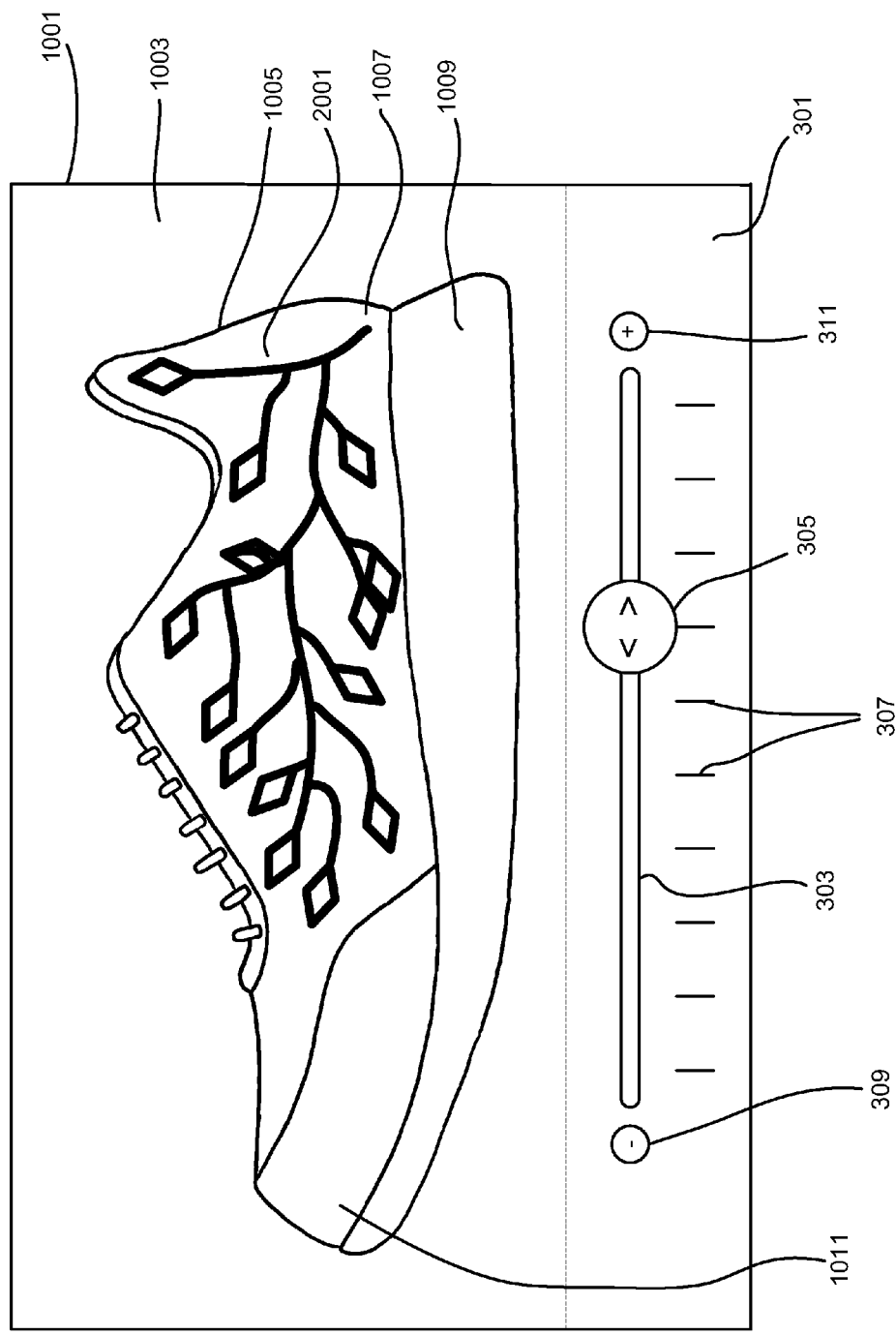

As with previously discussed embodiments of the invention, a user can manipulate the slider selection control 301 to select a desired line size for the image 2001. For example, in FIG. 20A the linear position indicator 305 is located along the linear range indicator 303 at a position corresponding to the third linear position marker 307. Thus, the lines making up the image 2001 are relatively thin. If the user repositions the linear position indicator 305 closer to the negative direction indicator 309 (i.e., to a "smaller" or "lower" position), then the line size of the image 2001 will be reduced. On the other hand, if the user repositions the linear position indicator 305 closer to the positive direction indicator 311 (i.e., to a "greater" or "larger" position), then the line size of the image 2001 will be increased. For example, FIG. 20B illustrates the line size of the image 2001 when the linear position indicator 305 is located along the linear range indicator 303 at a position corresponding to the seventh linear position marker 307. As seen in this figure, the lines making up the image 2001 in FIG. 20B are substantially thicker than the image lines shown in FIG. 20A.

Figure 21A:
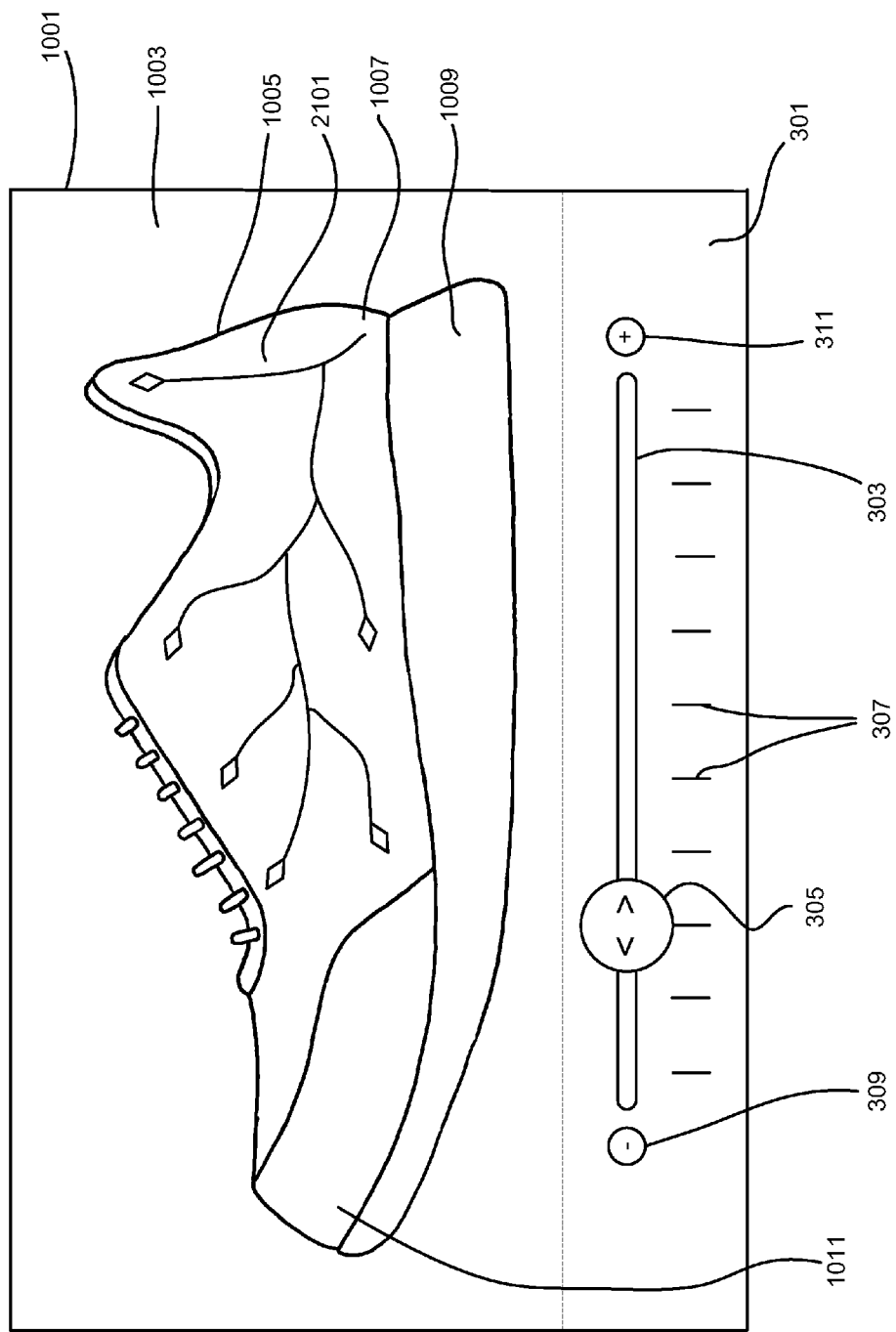
FIGS. 21A and 21B illustrate an implementation of a custom-ordering user interface configured for specifying the density of an image according to various embodiments of the invention.

Still further, various embodiments of the invention may allow a user to change the density of an image. FIG. 21A, for example, illustrates an implementation of the custom-ordering user interface 1001 configured for specifying the density of an image according to various embodiments of the invention. That is, the custom-ordering user interface 1001 illustrated in FIG. 21A allows a user to determine how much of the article is covered by the image per a unit area of the article. Again, the custom-ordering user interface 1001 includes a feature indicator 1003 and the slider selection control 301. The custom-ordering user interface 1001 displays an athletic shoe 1005 with an image 2101. In FIG. 21A, the image 2101 is an abstract pattern resembling a vine, but again it should be appreciated that this image is merely a representative image, and various examples of the invention may be configured to allow a user to select the scaled size of any desired image.

With the illustrated example, a user can manipulate the slider selection control 301 to select a desired density size for the image 2101. For example, in FIG. 21A, the linear position indicator 305 is located along the linear range indicator 303 at a position corresponding to the third linear position marker

Figure 21B:
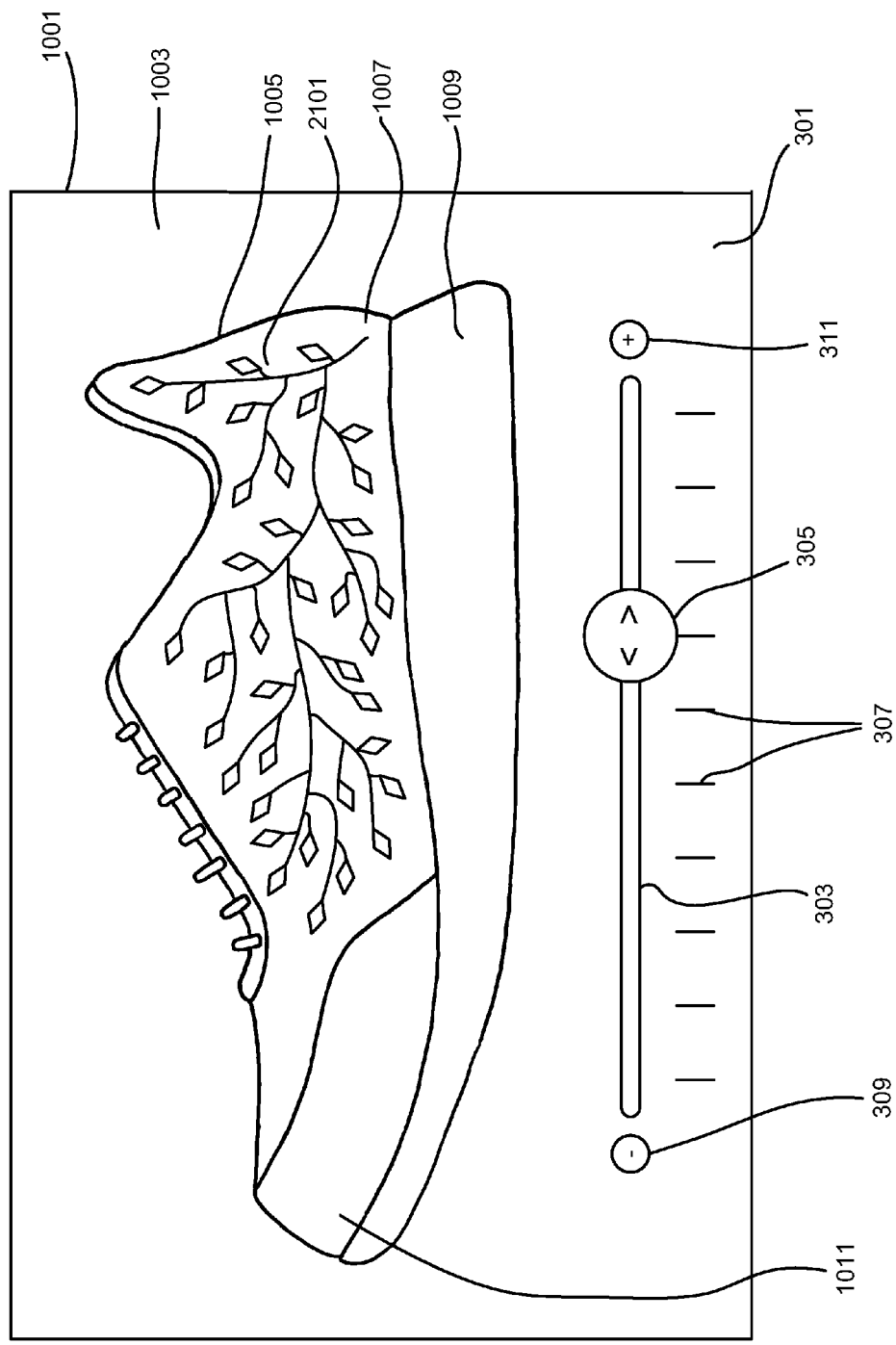

307. Accordingly, with the illustrated "vine" image 2101, there are relatively few "branches" making up the vine. If the user repositions the linear position indicator 305 closer to the negative direction indicator 309 (i.e., to a "smaller" or "lower" position), then the number of branches in the image 2101 will be reduced. If, however, the user repositions the linear position indicator 305 closer to the positive direction indicator 311 (i.e., to a "greater" or "larger" position), then the number of branches in the image 2101 will be increased. For example, FIG. 21B illustrates the how the density of the image 2001 has increased when the linear position indicator 305 is located along the linear range indicator 303 at a position corresponding to the seventh linear position marker 307. As seen in this figure, there are substantially more branches making up the image 2101 than the image lines shown in FIG. 21A.

Figure 22:
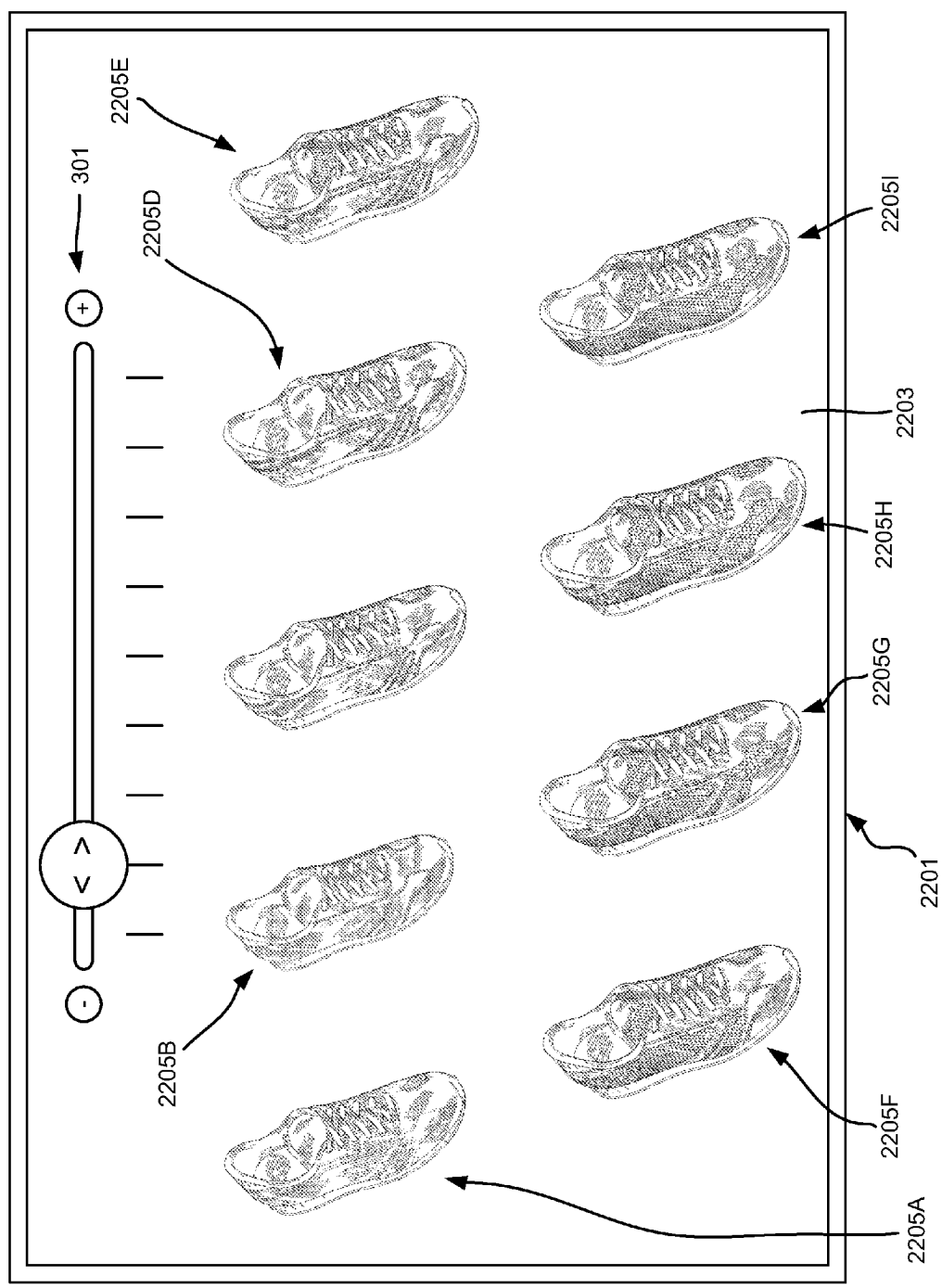
FIG. 22 illustrates an example of a custom-ordering user interface that may be implemented to select among different images that will be emblazoned upon an article of footwear according to various embodiments of the invention.

FIG. 22 illustrates yet another example of a custom-ordering user interface that may be implemented according to various embodiments of the invention. As seen in this figure, the custom-ordering user interface 2201 is configured to select among different images that will be emblazoned upon an article of footwear. The custom-ordering user interface 2201 includes the slider selection control 301 and a characteristic indicator 2203. Unlike the feature indicator 1003 shown in previous figures, the characteristic indicator 2203 displays only the selection of characteristics that are available for a feature. In the illustrated example, the custom-ordering user interface 2201 displays various images 2205 that can be emblazoned on the upper of an athletic shoe. As seen in this figure, each image will cover progressively more surface area of the upper. For example, image 2205I will cover slightly more surface area of a shoe upper than image 2205H. Image 2205I, on the other hand, will cover much more surface area of a shoe upper than image 2205B, which in turn will cover slightly more surface area of a shoe upper than image 2205A.

In the illustrated examples, the images 2205A-2205I are abstract patterns. Further, the images 2205A-2205I are created by removing a portion of an outer surface of the shoe upper to reveal an underlying mesh layer. It should be appreciated, however, that with alternate examples of the invention, the images may be of any desired type. Further, the images may be emblazoned on the article using any desired technique, including printing, weaving, or lamination.

As with previously discussed embodiments of the invention, a user can manipulate the slider selection control 301 to select the desired image 2205 (i.e., the desired total image size) to be emblazoned on an upper. For example, in FIG. 22, the linear position indicator 305 is located along the linear range indicator 303 at a position corresponding to the second linear position marker 307. Thus, the image 2205B is selected for emblazoning on a shoe upper. If the user repositions the linear position indicator 305 closer to the negative direction indicator 309 (i.e., to a "smaller" or "lower" position), then a smaller sized image 2205 will be selected. Similarly, if the user repositions the linear position indicator 305 closer to the positive direction indicator 311 (i.e., to a "greater" or "larger" position), then a larger sized image 2205 will be selected. For example, if the linear position indicator 305 were moved to a location on the linear position indicator corresponding to the ninth position marker 307, then image 2205I would be selected to be emblazoned on the show upper. In FIG. 22, the various images 2205 are abstract patterns, but it should be appreciated that these particular images are merely representative, and various examples of the invention may be configured to allow a user to select any desired image or group of images.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of customizing an article, comprising:
transmitting data including information to enable generation of an analog-style selection control on a display device, wherein the analog-style selection control is provided for receiving user input modifying a characteristic of a feature of an article to be customized;
transmitting data including information to enable generation of an initial rendering of the article to be customized on the display device;
receiving user input through the analog-style selection control for modifying the characteristic of the feature; and
transmitting data including information to enable generation of a modified rendering of the article to be customized on the display device based on the user input received modifying the characteristic of the feature.

2. The method recited in claim 1, wherein the analog-style selection control is a linear selection control.

3. The method recited in claim 1, wherein the analog-style selection control is a dial selection control.

4. The method recited in claim 1, wherein the article to be customized is an article of athletic equipment or an article of apparel.

5. The method recited in claim 1, wherein the article to be customized is an article of footwear.

6. The method recited in claim 5, wherein the feature is a fraction pattern on a sole of the article of footwear.

7. The method recited in claim 5, wherein the feature is a stability feature of the article of footwear.

8. The method recited in claim 5 wherein the feature is a cushioning feature of the article of footwear.

9. The method recited in claim 1, wherein the feature is a color of the article.

10. The method recited in claim 1, wherein the feature is a color scheme for the article.

11. The method recited in claim 1, wherein the feature includes one of: an amount of a pattern displayed on the article to be customized, a complexity of a pattern displayed on the article to be customized, a size of an area of a pattern displayed on the article to be customized, a size of an image displayed on the article to be customized, or a ratio of contrasting surfaces to be provided on the article to be customized.

12. The method recited in claim 1, further comprising:
receiving user input identifying the feature of the article to be customized.

13. An apparatus, comprising:
a processor; and
a memory having stored therein machine executable instructions, that when executed, cause the processor to:
transmit data including information to enable generation of an analog-style selection control on a display device, wherein the analog-style selection control is provided for receiving user input modifying a characteristic of a feature of an article to be customized;

transmit data including information to enable generation of an initial rendering of the article to be customized on the display device;

receive user input through the analog-style selection control for modifying the characteristic of the feature; and transmit data including information to enable generation of a modified rendering of the article to be customized on the display device based on the user input received modifying the characteristic of the feature.

14. The apparatus recited in claim 13, wherein the analog-style selection control is a linear selection control.

15. The apparatus recited in claim 13, wherein the analog-style selection control is a dial selection control.

16. The apparatus recited in claim 13, wherein the article to be customized is an article of athletic equipment or an article of apparel.

17. The apparatus recited in claim 13, wherein the article to be customized is an article of footwear.

18. The apparatus recited in claim 17, wherein the feature is a fraction pattern on a sole of the article of footwear.

19. The apparatus recited in claim 17, wherein the feature is a stability feature of the article of footwear.

20. The apparatus recited in claim 17, wherein the feature is a cushioning feature of the article of footwear.

21. The apparatus recited in claim 13, wherein the feature is a color of the article.

22. The apparatus recited in claim 13, wherein the feature is a color scheme for the article.

23. The apparatus recited in claim 13, wherein the feature includes one of: an amount of a pattern displayed on the article to be customized, a complexity of a pattern displayed on the article to be customized, a size of an area of a pattern displayed on the article to be customized, a size of an image displayed on the article to be customized, or a ratio of contrasting surfaces to be provided on the article to be customized.

24. The apparatus recited in claim 13 wherein the memory further has stored therein machine executable instructions, that when executed, further cause the processor to receive user input identifying the feature of the article to be customized.

25. An apparatus, comprising:

a processor; and a memory having stored therein machine executable instructions, that when executed by the processor, cause the apparatus to:

present to a user on a display device an analog-style selection control that allows a user to modify a characteristic of a feature of an article to be customized;

present to the user an initial rendering of the article to be customized on the display device;

receive user input through the analog-style selection control for modifying the characteristic of the feature; and present to the user a modified rendering of the article to be customized ordered on the display device based on the user input received modifying the characteristic of the feature.

* * * * *